(12) United States Patent
Blair et al.

(10) Patent No.: US 7,155,477 B2
(45) Date of Patent: Dec. 26, 2006

(54) METHOD AND SYSTEM FOR CONTINUOUS INTERACTIVE COMMUNICATION IN AN ELECTRONIC NETWORK

(75) Inventors: John Blair, San Francisco, CA (US); Robert Pasker, San Francisco, CA (US)

(73) Assignee: Kenamea, Inc., San Francisco, CA (US)

( * ) Notice: Subject to any disclaimer, the term of this patent is extended or adjusted under 35 U.S.C. 154(b) by 654 days.

(21) Appl. No.: 09/896,017

(22) Filed: Jun. 28, 2001

(65) Prior Publication Data

US 2001/0049721 A1 Dec. 6, 2001

(30) Foreign Application Priority Data

Nov. 22, 2000 (WO) ............... PCT/US00/32246

(51) Int. Cl.
*G06F 15/16* (2006.01)
*G06F 12/14* (2006.01)
*G06F 13/00* (2006.01)
*G09F 5/02* (2006.01)

(52) U.S. Cl. ............... 709/203; 709/215; 709/229; 711/14; 711/12; 711/163

(58) Field of Classification Search ........ 709/201–205, 709/227, 250, 242, 224, 249, 228–229, 220, 709/221; 345/744; 719/311; 703/27; 370/389; 705/42, 26, 8, 21, 43; 715/744; 707/201; 711/14, 112, 163

See application file for complete search history.

(56) References Cited

U.S. PATENT DOCUMENTS

| | | | |
|---|---|---|---|
| 5,481,542 A | 1/1996 | Logston et al. | ............ 370/94.2 |
| 5,675,741 A * | 10/1997 | Aggarwal et al. | .......... 709/242 |
| 5,754,830 A * | 5/1998 | Butts et al. | ................. 719/311 |
| 5,854,901 A | 12/1998 | Cole et al. | ............ 395/200.75 |
| 5,958,007 A | 9/1999 | Lee et al. | ................... 709/219 |
| 5,978,804 A | 11/1999 | Dietzman | .................... 707/10 |
| 5,991,739 A | 11/1999 | Cupps et al. | ................. 705/26 |

(Continued)

Primary Examiner—David Wiley
Assistant Examiner—Jude J. Jean-Gilles
(74) Attorney, Agent, or Firm—Dergosits & Noah LLP

(57) ABSTRACT

A method and system are disclosed for providing continuous, interactive communication among devices on an electronic network (110). A permanent, dedicated symmetric connection is provided between a server application and a client device (164). Both client and server can therefore communicate bi-directionally. Message storage is provided for allowing messages to be stored (166,178) while the client is offline or otherwise unavailable. The method and system is operable with any addressable device (164, 174, 174) on the electronic network. The invention can be used as an alternative to, or in conjunction with, prior art electronic network communication methods. The invention implements an advanced message routing system. A set of base capabilities are built on top of the message routing system. The communication method and system according to the present invention use a graphical user interface to virtually represent the applications that are used to interact with the electronic network. These graphical representations (276) are used to facilitate the transmission and receipt of messages across the electronic network. Applications according to the present invention are grouped into different levels according to their increasing levels of power and specificity. An interface (384, 472) is also provided to iconically represent the underlying interactive connections of the communication system. The present invention provides a one-to-one connection for bi-directionally publishing and receiving messages and a one-to-many connection. This interface enables applications to interact and deliver any type of focused functionality.

12 Claims, 22 Drawing Sheets

U.S. PATENT DOCUMENTS

| | | | |
|---|---|---|---|
| 5,995,626 A | 11/1999 | Nishioka et al. | 380/30 |
| 6,003,019 A | 12/1999 | Eaton et al. | 705/42 |
| 6,061,603 A | 5/2000 | Papadopoulos et al. | 700/83 |
| 6,078,321 A * | 6/2000 | Simonoff et al. | 715/744 |
| 6,108,687 A * | 8/2000 | Craig | 709/203 |
| 6,151,625 A | 11/2000 | Swales et al. | 709/218 |
| 6,243,750 B1 * | 6/2001 | Verma | 709/224 |
| 6,304,881 B1 * | 10/2001 | Halim et al. | 707/201 |
| 6,311,165 B1 * | 10/2001 | Coutts et al. | 705/21 |
| 6,347,341 B1 * | 2/2002 | Glassen et al. | 709/250 |
| 6,374,207 B1 * | 4/2002 | Li et al. | 703/27 |
| 6,385,592 B1 * | 5/2002 | Angles et al. | 705/14 |
| 6,697,360 B1 * | 2/2004 | Gai et al. | 370/389 |
| 6,760,766 B1 * | 7/2004 | Sahlqvist | 709/227 |
| 6,950,874 B1 * | 9/2005 | Chang et al. | 709/229 |

* cited by examiner

|  | Status | Length | Sender |
|---|---|---|---|
| User |  ⊘ | 45 Seconds | Julie Campbell |
| You Have New | ○ | 95 Seconds | 919.452.3256 |
| Voicemail | ⊘ | 23 Seconds | Alex Pemberthy |
| Messages | ⊘ | 72 Seconds | Willie Garvin |
|  | ○ | 15 Seconds | Julie Campbell |
|  | ○ | 19 Seconds | Gerald Tarrant |
|  | ⊘ | 8 Seconds | Jack Fraser |

350

320

| Status | Voicemail Messages Length | Sender | 322 | 324 | 326 |
|---|---|---|---|---|---|
| ⊘ | 45 Seconds | Julie Campbell | [Listen] | [Erase] | [Save] |
| ○ | 95 Seconds | 919.452.3256 | [Listen] | [Erase] | [Save] |
| ⊘ | 23 Seconds | Alex Pemberthy | [Listen] | [Erase] | [Save] |
| ⊘ | 72 Seconds | Willie Garvin | [Listen] | [Erase] | [Save] |
| ○ | 15 Seconds | Julie Campbell | [Listen] | [Erase] | [Save] |
| ○ | 19 Seconds | Gerald Tarrant | [Listen] | [Erase] | [Save] |
| ⊘ | 8 Seconds | Jack Fraser | [Listen] | [Erase] | [Save] |

*FIG. 17*

| Book Sales Tracking System | | | | |
|---|---|---|---|---|
| Category | Target | Rate | Deviation | Mgmt |
| Best Seller | 1235 | 1356 | 1389 | [Edit] |
| Romance | 456 | 172 | 1356 | [Edit] |
| Mystery | 565 | 452 | 2096 | [Edit] |
| Mon-Fiction | 376 | 414 | 10176 | [Edit] |

330, 332

| Sales Management | | | 340 | 338 |
|---|---|---|---|---|
| Category Mystery | Target 565 | Rate 452 | Deviation 20% | Mgmt |
| Price Action | [-10%] | [-15%] | [-20%] | [-30%] |
| Duration | [1 Hour] | [2 Hour] | [4 Hour] | [1 Day] |
| Eligibility | [All] | [Gold Plus] | [Platinum Only] | |
| Spread | [National] | [Pacific] | [Mountain] | [East] |

*FIG. 18*  336  334

METHOD AND SYSTEM FOR CONTINUOUS INTERACTIVE COMMUNICATION IN AN ELECTRONIC NETWORK

BACKGROUND OF THE INVENTION

1. Field of the Invention

The present invention relates generally to a method and system for providing continuous communication in an electronic network. Specifically, the invention is a method and system for bi-directional communication that enables and facilitates the creation and use of interactive Internet applications.

2. Description of Related Art

The use of the Internet and other electronic networks has resulted in an increasing shift from software applications designed to run on client computers to server-based applications that are accessible to the client computers of the electronic network. A typical prior art method for a client computer to interact with such server-based applications is through use of a Web browser application. A Web browser application enables the client computer to make requests to and receive responses from the server.

FIG. 1 is a system diagram illustrating the Internet-based communication according to the prior art. In the traditional model, a browser application operable on a client device 14 is used to communicate across the electronic network, such as the World Wide Web ("Web") 10.

The browser application is used to permit the client device to communicate with a Web site 12. In this prior art model, the user is limited to contact with the selected active Web site. Furthermore, such contact can only be initiated and maintained during the actual visit to the Web site, referred to as a "session" 16. This traditional model requires substantial device capabilities and has therefore been limited to computers and certain other devices such as Internet-capable telephones and personal digital assistants.

FIG. 2 is a graphical user interface illustrating a standard network-delivered service according to the prior art. In the prior art, a browser 20 provides a window 22 in which content from a web site is displayed. Browser applications, however, can be prone to data transmission errors. Furthermore, slow connection speeds between the client device and the Web site server can result in an unsatisfactory user experience.

The prior art browser mode is subject to several additional significant limitations. First, the prior art browser model is unidirectional. Thus, while the client computer can make a request to the server and the server can respond, the server cannot, in turn, make a request to the client computer and receive a corresponding response.

Second, if the browser application is not directed to the site at which the desired the network service is located, interaction between the client and the site is terminated. Thus, communication is not continuously maintained, for example, if the browser application is closed. In addition, it can be difficult to control the allocation of bandwidth and processor capacity in the prior art model. As a result, available processor capacity for other applications running on the client computer can be severely restricted or interrupted, for example when the client device is downloading a large file.

It would therefore be an advantage to provide a method and system for bi-directionally connecting a network-based application to a client device. It would be a further advantage if this method and system provided a persistent connection to a site while the client device is in communication with the electronic network, and not just when the client is browsing at the site. It would be yet another advantage if such method and system were available to all addressable devices on an electronic network.

SUMMARY AND OBJECTS OF THE INVENTION

The present invention is a method and system for providing continuous, interactive communication among devices on an electronic network. The invention provides a permanent, dedicated connection between a server application and a client device. This connection persists during the entire time the client device is in communication with the electronic network.

The connection according to the present invention is symmetric and bi-directional. Thus, both client and server can initiate communication, requests, conversations, and transactions. In addition, the method and system according to the present invention is operable with any addressable device on the electronic network. The invention can be used as an alternative to, or in conjunction with, prior art electronic network communication methods such as Web browsers, file transfer protocol applications, e-mail applications, and data streaming applications.

The present invention also implements an advanced message routing system. This message routing system supports such features as device-level addressing, typed data, and publish/subscribe message distribution. The message routing system also supports addressing to a user, group of users, topic, device or application.

The present invention includes a set of base capabilities that are built on top of the message routing system. These base capabilities can include client presentation and interaction capabilities, message management capabilities, and the provision and management of a data storage area on the device for each Internet application.

The preferred embodiment of the present invention includes a bi-directional communications channel through the Internet from an Internet application to a client device. Storage is provided within the bi-directional communications channel for allowing messages to be stored while the client is offline or otherwise unavailable. An Internet management system is used to allow Internet applications to create, delete, and manage messages, users, permissions and all other aspects of the system configuration. Gateways are used to connect the Internet management system to addressable but not internetworked devices, e.g. faxes and Web pages that are not on the network, but that are reachable through electronic or other communication means.

Storage is also provided on the client device for allowing messages to be stored while the client is offline or otherwise unavailable. In addition, a user management system allows the user to create, delete, and manage streams, users, permissions and all other aspects of the system and client configuration.

In the preferred embodiment, a communication system server application sends messages to, and receives messages from, application elements in communication with the electronic network, such as network application providers and clients. The communication system server functions as a multiplexer and demultiplexer by routing each of the messages received from different sources on the electronic network to its intended destination(s). The communication system therefore provides one or more private communications channels between any two or more application elements on the electronic network.

In the preferred embodiment, the communication system server sends and receives messages from a dedicated software module that is located on the client device. The dedicated client software module manages all aspects of the present invention on the client that are necessary for the function of the invention, including but not limited to mediating messages between the client and the communications server, managing the installation of new applications that will use the present invention, setting and changing preferences and rules, and deleting messages.

The invention supports sub-addressing within an individual address. Sub-addressing permits messages to be directed to particular devices or applications, such as a personal digital assistant, cell phone, fax machine, answering machine, desktop computer, laptop computer, as well as for any other type of device that is capable of being connected to the electronic network.

The communication system according to the present invention uses a graphical user interface, referred to as a NetButton, to facilitate the transmission and receipt of messages across the electronic network. In the preferred embodiment, NetButtons virtually represent the applications that are used to interact with the electronic network. For example, in one embodiment, a NetButton can be used to graphically represent a particular topic. The user can manipulate this topic using the NetButton. A NetButton can be represented as a message and can therefore be transmitted to other devices on the electronic network.

In the preferred embodiment of the present invention, a user's desktop graphical user display includes a message window that lists the messages that have been received by the user or subscriptions for which the user is enrolled. These messages can include any objects including but not limited to NetButtons, text or graphical messages, or application data.

An application display window displays a list of addresses on the electronic network. These addresses can be displayed, for example, as a text list, icons, or NetButtons. Thus, it is possible to display an icon for an individual, for a group of individuals, or for a device such as a fax machine.

A NetButton in the application display window can be selected by any well-known method, such as by clicking on the NetButton graphical representation. Applications and messages can be dragged between the application display window and the message window. Thus, messages including but not limited to URLs, audio files, and graphic images can be dragged onto these NetButtons. The application associated with the respective message type and NetButton is thereby performed. NetButtons can be stored on the user's client device, or in any networked location accessible to that client device.

A user can select an object from window and drag the object to an address in the second window. The object will then be transmitted to the selected address. Alternatively, the object can be dragged onto an address representing a device, such as a fax machine. In this case, the object will be sent directly to the selected fax machine. Subscriptions, for example to interest groups, can be similarly transmitted.

In the presently preferred embodiment, applications are grouped into four different levels according to their increasing levels of power and specificity. A Level Zero application places no application-specific code on the client and is implemented solely on the application provider's server. Messages are sent by that server and accessed or displayed on the client using the present invention. A Level One application places some code on the client and uses user input services provided by the present invention to allow the user to initiate, and to respond to, information and transactions. In a Level Two application, the application provider creates application software that is operable on the user's device and that communicates with corresponding software on the application server using the present invention. A Level Three application is a stand-alone application that runs on the client separately from the communication system software but uses the communications system.

One feature provided in the preferred embodiment of the present invention is an interface to the underlying interactive connections of the communication system. This interface, referred to as a "TubeTop" is an iconic representation of a permanent connection, referred to as a "Tube", to at least one other address on the electronic network. The present invention provides two types of basic connectivity capabilities—a one-to-one connection for bi-directionally publishing and receiving messages, and a one-to-many connection.

The TubeTops according to the present invention can be used to represent with icons or NetButtons any individual person, groups of people, or device on the electronic network. These icons or NetButtons represent the ability to send information to or receive information from the respective people, topics, or devices through the communication system. The TubeTop is essentially a defined standard interface sitting "on top" of a Tube and that leverages all of the Tube's abilities to enable appliance-like applications to interact and deliver any kind of focused functionality The TubeTop feature according to the present invention can readily be used to facilitate topic-based communication. In addition, the TubeTop feature can be used as an interface to particular functions or services. When a TubeTop NetButton is selected, an application window appropriate to the respective NetButton opens. The Tube delivery feature can be used to transfer information directly to a file or to an application.

Tube connection according to the present invention can be used, for example, to permit users to build and share mutual collections of files. The Tube delivery feature can also be used to share information. Another type of TubeTop is as application that can be used to create and transmit information to a selected person or device on the electronic network.

BRIEF DESCRIPTION OF THE DRAWINGS

FIG. 17 is a graphical user interface illustrating integration of a Level Two application according to the present invention with a networked prior art message service application. 1, FIG. 18 is an eCommerce sales merchandising system according to the present invention.

DETAILED DESCRIPTION OF THE INVENTION

The present invention is a method and system for continuous, interactive communication across an electronic network such as the Internet, a wide-area network, or a local area network. In particular, the invention can be used as an alternative to, or in conjunction with, prior art electronic network communication methods such as Web browsers, file transfer protocol applications, e-mail applications, and data streaming applications. The present invention can be used with any device that can be connected to the electronic network, including but not limited to a server computer, personal computer, network computer, dumb terminal, personal digital assistant ("PDA"), pager, Internet-capable telephone, global positioning device, and fax machine.

In the following description, for purposes of explanation, numerous specific details are set forth in order to provide a thorough understanding of the present invention. It will be evident, however, to one skilled in the art that the present invention may be practiced without the specific details. In other instances, well-known structures and devices are shown in block diagram form to facilitate explanation. The description of preferred embodiments is not intended to limit the scope of the claims appended hereto. In one embodiment, the present invention is implemented using a computer. Such computer can include but is not limited to a personal computer, network computer, network server computer, dumb terminal, local area network, wide area network, personal digital assistant, work station, minicomputer, and mainframe computer. The identification, search and/or comparison features of the present invention can be implemented as one or more software applications, software modules, firmware such as a programmable ROM or EEPROM, hardware such as an application-specific integrated circuit ("ASIC"), or any combination of the above.

Figure 1:
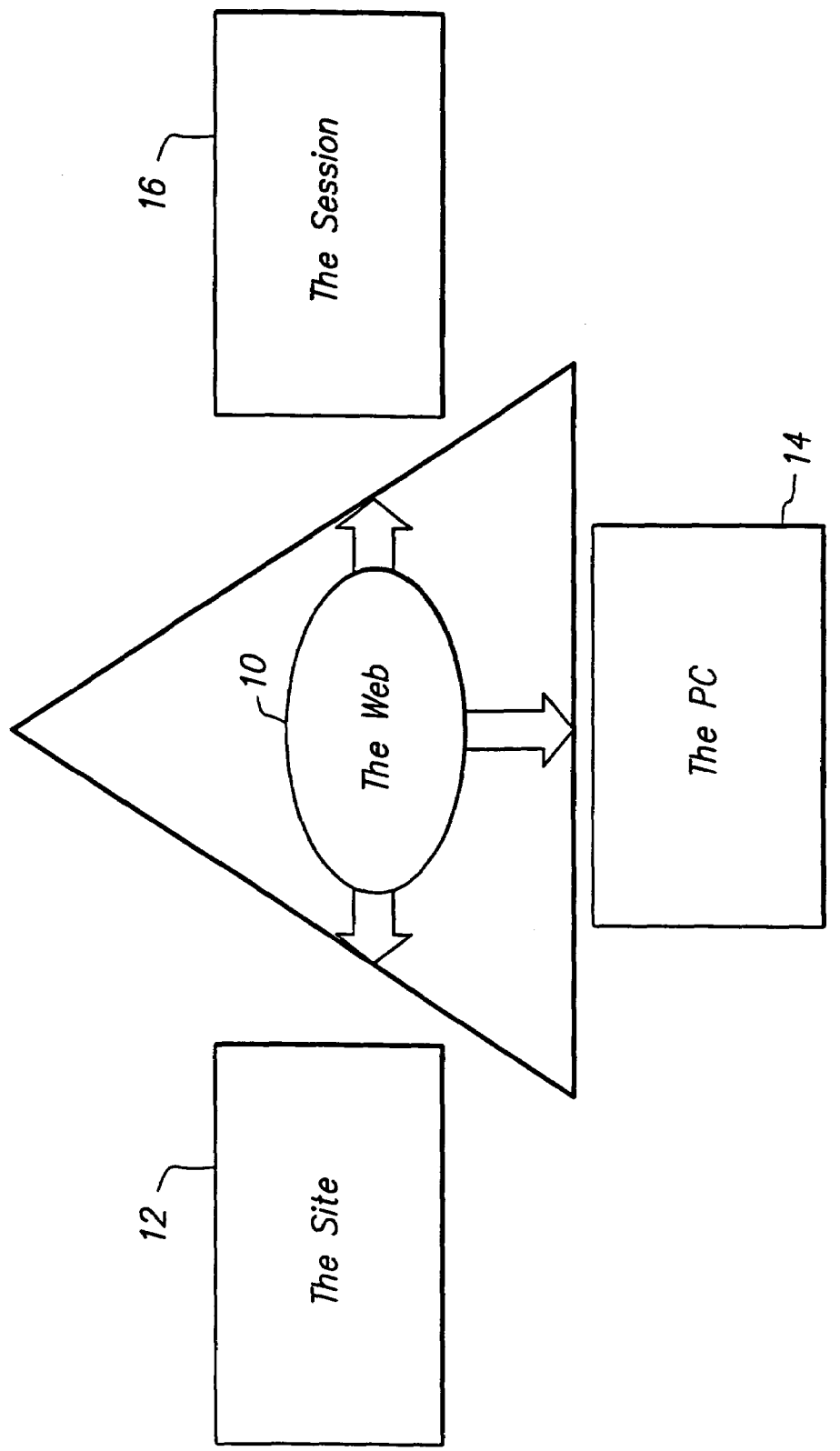
FIG. 1 is a system diagram illustrating the Internet-based communication according to the prior art.
Figure 2:
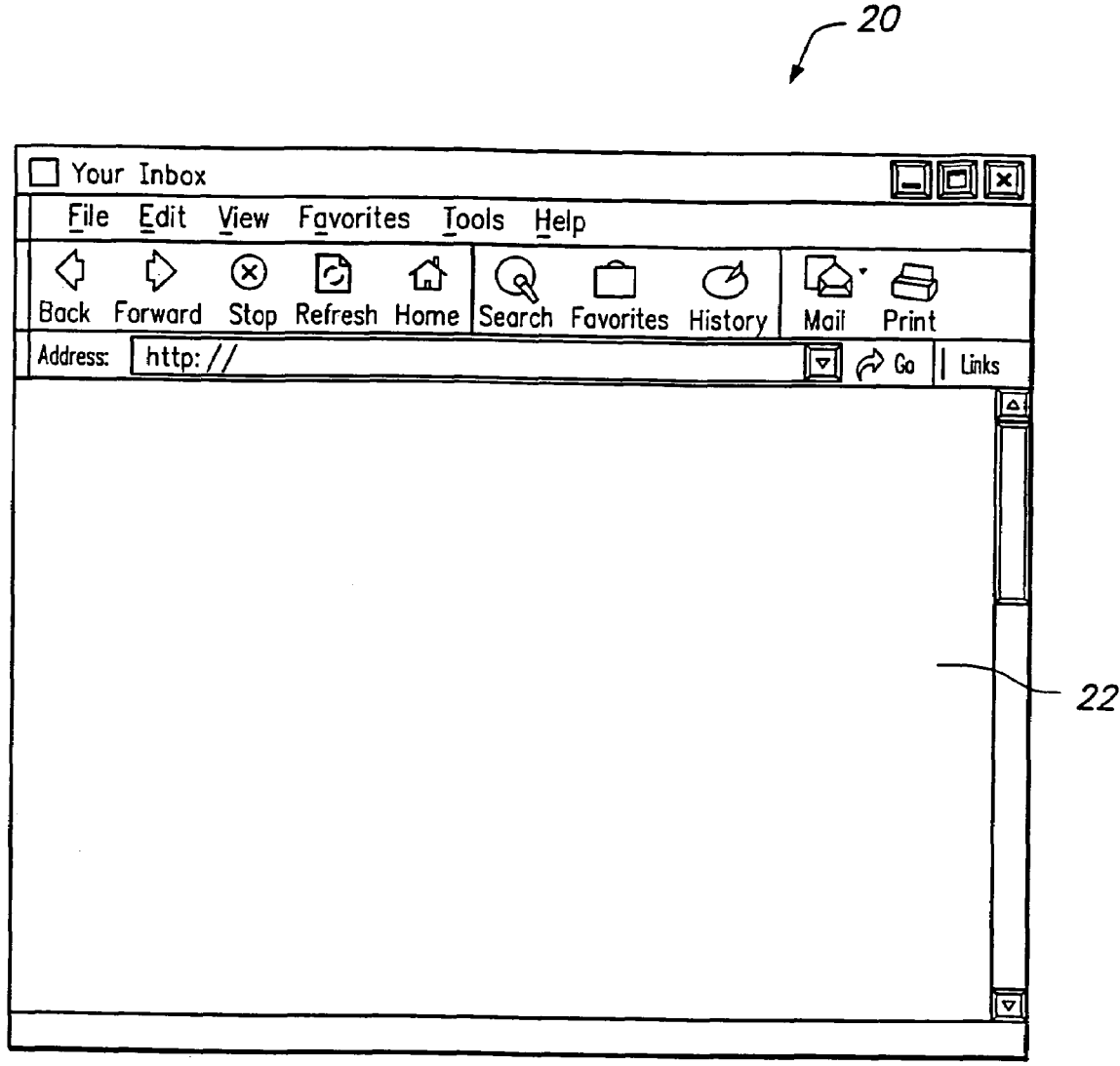
FIG. 2 is a graphical user interface illustrating a standard network-delivered service according to the prior art.
Figure 3:
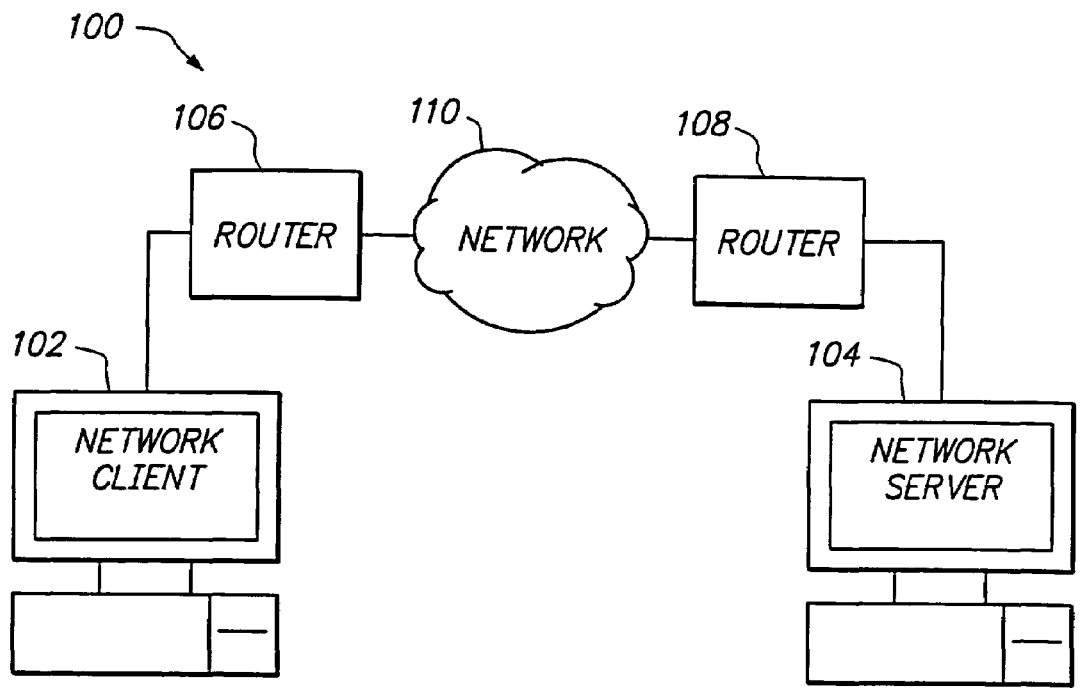
FIG. 3 is a block diagram of a computer network system according to one embodiment of the present invention.

FIG. 3 is a block diagram of a computer network system 100 according to one embodiment of the present invention. In computer network system 100, a network server computer 104 is connected to a network client computer 102 through a network 110. The network interface between server computer 104 and client computer 102 can also include one or more routers, such as routers 106 and 108. The routers serve to buffer and route the data transmitted between the server and client computers. Network 110 may be the Internet, a Wide Area Network (WAN), a Local Area Network (LAN), or any combination thereof. In one embodiment of the present invention, the server computer 104 is a World-Wide Web (WWW) server that stores data in the form of 'web pages' and transmits these pages as Hypertext Markup Language (HTML) files over the Internet network 110 to client computer 102. It should be noted that, although only one server and client computer each are illustrated in network system 100, a network that implements embodiments of the present invention may include a large number of interconnected client and server computers.

The present invention also uses one or more software applications accessible to the client device and/or server computers to permit continuous, interactive communication across an electronic network. Any or all of the software applications or hardware configurations of the present invention can be implemented by one skilled in the art using well known programming techniques and hardware components.

The present invention implements an advanced message routing system. This message routing system, described below in further detail, supports such features as device-level addressing, typed data, and publish/subscribe message distribution. The message routing system also supports addressing to a user, group of users, topic, device or application.

The communication system service according to the preferred embodiment also includes a set of base capabilities that are built on top of the message switch. For example, electronic commerce ("eCommerce") businesses as well as other users of the present invention are provided with a set of client presentation and interaction capabilities. Rather than just providing the ability to transfer and to receive data, messages, or objects, the present invention also enables and facilitates the creation of interactive Internet applications to present information to a user and to receive information in return.

Another base service provided in the present invention is message management. For example, a user of the present invention can configure such features as the maximum lifetime of a message, redelivery permissions, and content management. This permits, for example, an eCommerce business to send a time-limited product to a user. The product expires within a designated time unless the user buys the product.

Yet another base service provided in the present invention is the provision and management of a data storage area on the device for each Internet application. This storage area allows the application to reliably store its own status information for its own purposes, for example to manage and update the application's code, or to store data for the next time the application is used.

In the following description, for purposes of explanation, numerous specific details are set forth in order to provide a thorough understanding of the present invention. It will be evident, however, to one skilled in the art that the present invention may be practiced without the specific details. In other instances, well-known structures and devices are shown in block diagram form to facilitate explanation. The description of preferred embodiments is not intended to limit the scope of the claims appended hereto. An Internet application is software whose component parts may reside partly or wholly on the server or the user's computer or other networked or addressable device. Communication between the component parts of the application occurs across the Internet.

Figure 4:
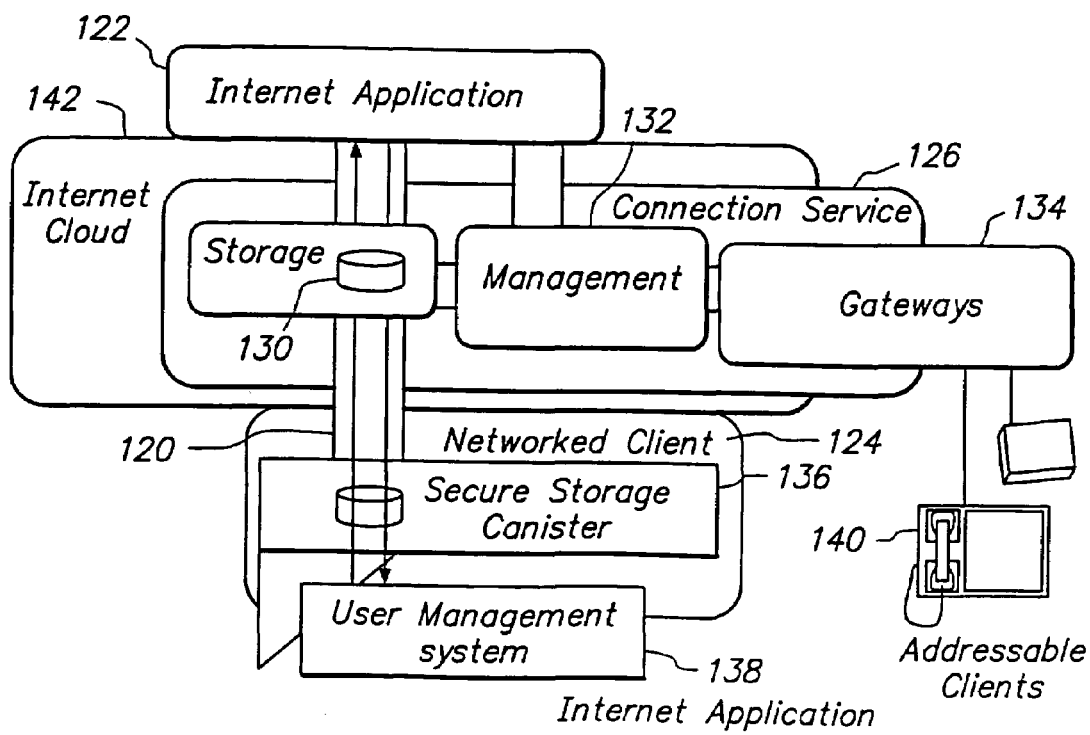
FIG. 4 is a system diagram showing software and system components according to the preferred embodiment of the present invention.

FIG. 4 is a system diagram showing software and system components according to the preferred embodiment of the present invention. The components of the present invention include:

A bi-directional communications channel 120 through the Internet 142 from an Internet application 122 to a client device 124. In the preferred embodiment of the invention this channel is provided by a network service 126. In alternative embodiments, the channel can be provided through software on the Internet application's server that connects directly to the client device.

Storage 130 within the bi-directional communications channel that allows messages to be stored while the client is offline or otherwise unavailable. In the preferred embodiment of the invention this storage is provided within the network service, but in alternative embodiments it can be provided on the Internet application's server.

An Internet management system 132 that allows Internet applications to create, delete, and manage messages, users, permissions and all other aspects of the system configuration. In the preferred embodiment of the invention, the Internet management system is provided within the network service, but in alternative embodiments it may be provided on the Internet application's server.

Gateways 134 that connect the management service to addressable but not internetworked devices 140, e.g. faxes and pages that are not on the network, but are reachable through electronic or other communication means.

Storage 136 on the client device that allows messages to be stored while the client is off-line or the otherwise unavailable. In the preferred embodiment of the invention, this storage is provided on some storage device local to or network-accessible from the client.

Storage (not shown) for application state on the client.

A user management system 138 that allows the user to create, delete, and manage streams, users, permissions and all other aspects of the system and client configuration. In the preferred embodiment of the invention, the user management system is provided locally on the client and within the network service. In alternative embodiments, the user management system can be provided at any other convenient location such as a Web site.

Figure 5:
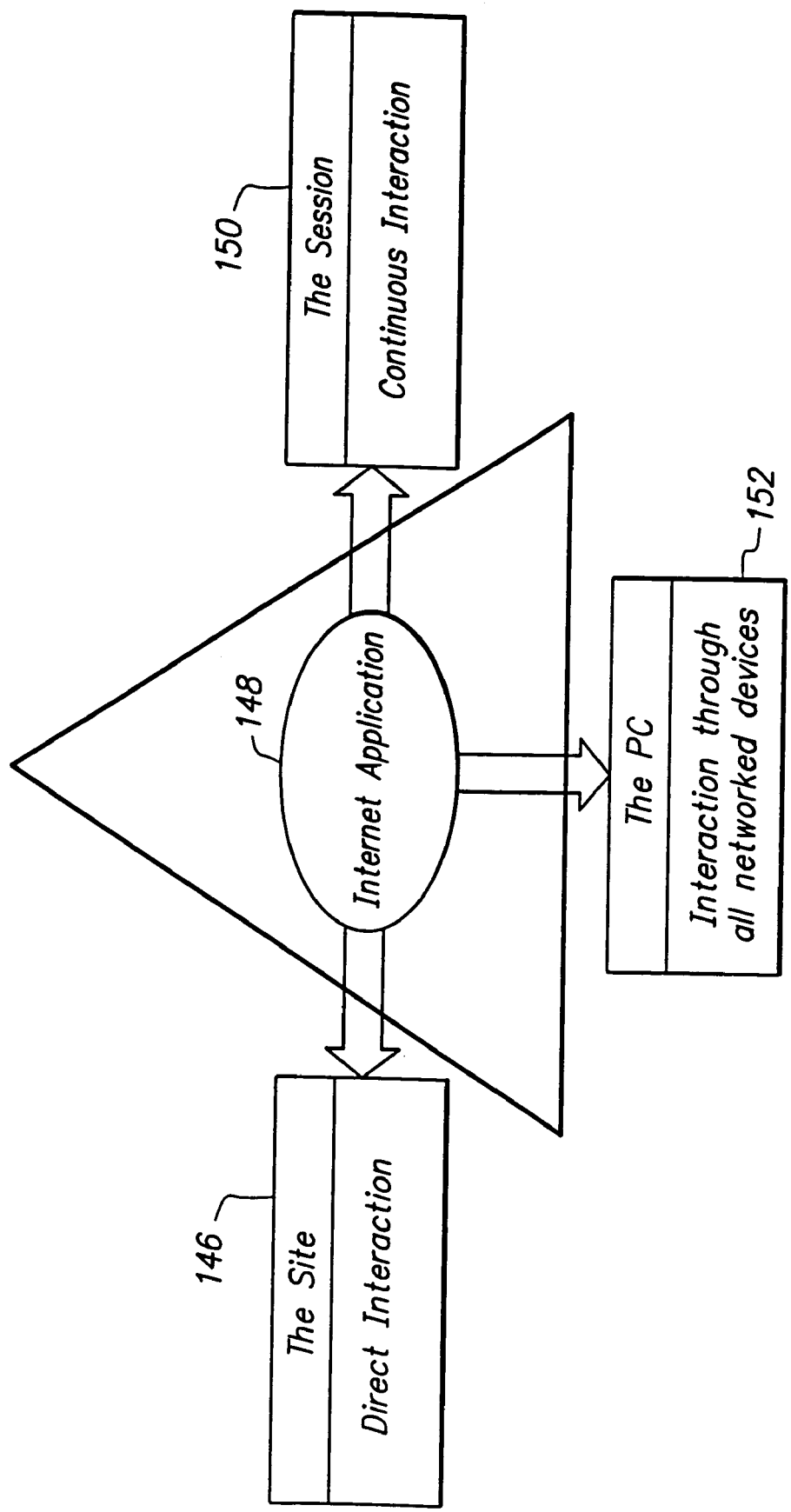
FIG. 5 is a system diagram illustrating Internet-based communication according to the present invention.

FIG. 5 is a system diagram illustrating Internet-based communication according to the present invention. The present invention overcomes the inherent limitations of the prior art by permitting direct interaction 146 between an Internet application and a client, rather than indirect interaction through a Web server. Continuous connection 150 can thereby be provided with the Internet application 148, rather than the prior art connection only during the time that there is a browser connection to the particular Web server or site. Because a browser is optional, any type of network device 152 can be used to interact with devices connected to the Web.

Figure 6:
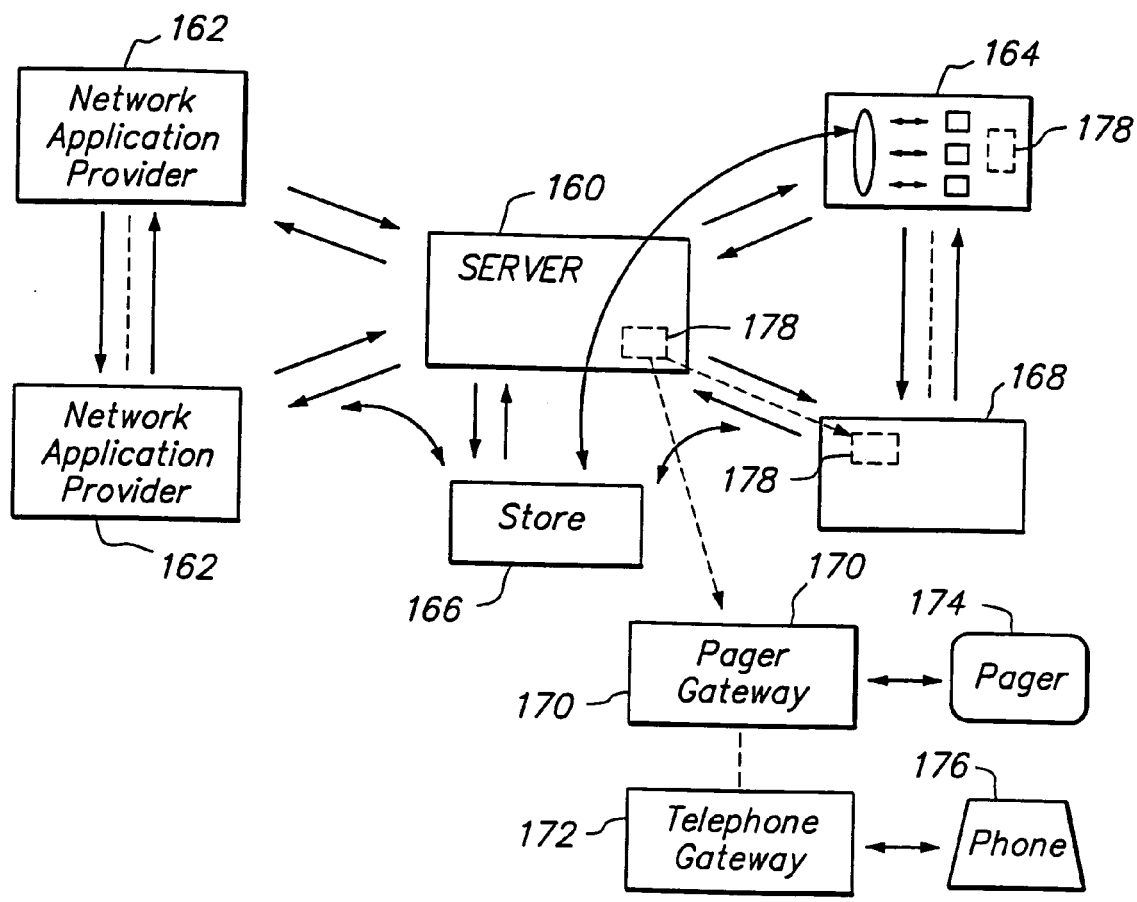
FIG. 6 is a system diagram illustrating the method for continuous, interactive communication according to the preferred embodiment of the present invention.

FIG. 6 is a system diagram illustrating the method for continuous, interactive communication according to the preferred embodiment of the present invention. In the preferred embodiment, the communication system server 160 functions as a "funnel" to route, multiplex, demultiplex, and redistribute the electronic communications traffic among the elements of the applications using the present invention. The communication system server can comprise one or more server computers, personal computers, computer networks, and networked devices.

In the preferred embodiment, the communication system server sends messages to, and receives messages from, application elements in communication with the electronic network, such as network application providers 162 and clients 164. The communication system server functions as a multiplexer and demultiplexer by routing each of the messages received from different sources on the electronic network to its intended destination(s). The communication system therefore provides one or more private communications channels between any two or more application elements on the electronic network.

In the preferred embodiment, the communication system server sends and receives messages from a dedicated software platform that is located on the client and is a part of the present invention. The dedicated software platform manages all aspects of the present invention on the client that are necessary for the function of the invention. These aspects include but are not limited to: mediating messages between the client and the communications server; managing the installation of new applications that will use the present invention, setting and changing preferences and rules, and deleting messages.

The communication system server stores messages received from the various application elements in a server message store 166 and forwards these messages to the intended destinations. The software-implemented message store is at least one non-volatile storage such as a hard disk drive or a NVRAM memory that is preferably a part of the server, but can alternatively be located on any device that is accessible to the server. The communication system server thus functions as a store-and-forward message switch, providing the system with the ability to accommodate vagaries of connectivity in the network. While the present invention can be implemented with any appropriate electronic network, in the preferred embodiment, it is implemented as an Internet-based service.

In the presently preferred embodiment, the communication system server can provide a guaranteed delivery of a stored messages to the intended destination(s). When a message has been delivered to a client, the communication system server can retain control over the message until the client submits to the system server an electronic indication that confirms receipt and local storage of the message. Thus, the transmitting application or party can be made aware of whether the message was received. This feature is advantageous in electronic commerce because it minimizes the uncertainty as to whether an electronic transaction, such as a credit card purchase made through a Web site, has been completed.

The system according to the preferred embodiment also includes a client message store 178 that is preferably a non-volatile storage that is a part of the client. This client message store is used to store transactions during an off-line process. In alternative embodiments, the client message store can be stored on any device that is accessible to the client. For example, the client message store 178 can be stored on a local server 168 that is accessible to a client network computer 164. In another embodiment, the client message store is located on the system server.

The communication system server also provides the ability for one provider to send a message to one or more destinations, such as users. In turn, these clients are provided the ability to determine the origin of each received message.

In the communication system according to the preferred embodiment of the present invention, all application data that is transmitted through the electronic network is stored in the appropriate message store prior to being delivered to or accessed by the intended destination. This data is therefore accessed locally by the component devices of the communication system. In alternative embodiments, any portion of this data is stored in the appropriate message stores prior to delivery or access.

The system message store according to the preferred embodiment of the present invention is a transactionally safe store. The present invention provides a transactionally safe store on the user's desktop computer or other connected device to support disconnected operation. Thus, because the application data is stored in the message stores for local access, a client does not have to be on-line to access transaction information. For example, a client can initiate and/or respond to an eCommerce transaction regardless of whether the client is on-line by queuing the request or response in the client store.

Furthermore, the invention performs a traffic shaping function that minimizes the effects of receiving or transmitting data on the operation of the user's computer system. For example, when a large quantity of data is waiting to be transmitted to a user when the user goes on-line, this data transmission can occupy system resources to prevent the user from performing other activities. The invention minimizes the effects of such data transmission.

The present invention shapes this traffic by transparently managing the data to regulate any data the system can control so that it doesn't interfere with data over which there is no control. Thus, a user can select the level of bandwidth consumption that is acceptable for a particular transmission or message. For example, the user can elect to have the transmission use the maximum amount of possible bandwidth, to the exclusion of other transmissions. Alternatively, the user can elect for the transmission in the background, consuming a small amount of the available bandwidth.

This traffic shaping function also permits applications to interact with the message store to receive or transmit data when on-line or off-line, and to automatically re-connect when a connection to the electronic network has been prematurely terminated, recommencing the transmission at the point at which it was terminated, without any need to retransmit data. As a result, there is no loss of data to or from the applications.

The present invention implements an advanced message routing system. This message routing system supports user, topic, application, and device level addressing, supports typed data, and a publish/subscribe addressing model. The message routing system also supports addressing to a user or topic, as well as sub-addressing to a device.

In the preferred embodiment of the present invention, each message transmitted through the communication system has a known type that indicates characteristics of the message. For example, a message that is sent to an answering machine can indicate whether it is a voice message or an alphanumeric message. A typed voice message can be stored in the answering machine while a typed alphanumeric message can be stored in an address box that is part of the answering machine.

To route these messages, the present invention also provides an addressing mechanism that allows a message sender to designate the intended recipient of a message. The preferred embodiment supports two general types of addressing directed to individual addresses and topic-based addresses, respectively. A message that is sent to a topic-based address such as an interest-based list server will be delivered to the individual addresses of all members of the selected topic group. Thus, for example, the sender of the message can transmit a message to all destinations that have subscribed to the topic but does not have to know the individual destinations in advance.

Within the individual address, the invention can also have the ability to permit sub-addressing. Sub-addressing permits messages to be directed to particular devices or applications. For example, a user can have separate dedicated sub-addresses for a personal digital assistant, cell phone, fax machine, answering machine, desktop computer, laptop computer, as well as for any other type of device that is capable of being connected to the electronic network. As an example, a message sent to a topic-based address is directed to all individual addresses associated with the selected topic. For each individual address, the message is directed to any of the individual's sub-addresses.

Control over exactly how those messages are distributed to sub-addresses can be controlled by both the sender and the receiver. The sender or the receiver can set up an arbitrary set of rules based on preferences, intrinsic and extrinsic factors and parameters. For example, these rules can be driven by any of the attributes in the message including but not limited to the type, size, sender, and time. The rules can be used to direct, redirect, transform, and process received messages to particular devices or to other individuals.

A rules and filters engine associated with the user's client device(s) is operable to permit the user to set rules and filters and to direct messages accordingly. Filters can be used, for example, to prevent the delivery of low priority messages or messages of a particular type, such as audio files. In the preferred embodiment, a control panel is displayed as a part of a graphical user interface, for example, on a screen display of the user's desktop computer. The rules and filters engine is accessed through this control panel.

A series of gateways 170, 172 are used to permit the communication system to be bi-directionally connected with non-Internet protocol based devices. For example, the communication system can be interfaced with electronic devices such as alphanumeric pagers 174, e-mail pagers, cell phones 176, fax machines, remote controls, kitchen appliances, and virtually any electronic input or output devices for which some form of communications capability can be provided. A voice response gateway can be provided to allow the communication system to use speech synthesizer applications to "read" aloud a user's messages. The voice gateway can also allow the user to respond using such means as a touchpad or voice recognition. The user's response is then delivered by the communications system to its designated destination(s).

The message routing feature according the present invention allows the development and use of applications that can seamlessly and transparently interact over the electronic network. These applications can be incorporated as a part of the communication system software or can be separate from but accessible thereto. The applications can be configured to interact with prior art Web browsers, or other applications.

In one example of message routing according to the present invention, a credit card billing message is transmitted through the communication system to a user. The user can set up rules in the control panel to directly deliver messages of this type to a money management application. As a result, the credit card billing update can be fed directly into the money management application. Today, it must be viewed as an email i.e. in a different application, or it must be attached to an email and manually transferred to the management application by the user.

Figure 7:
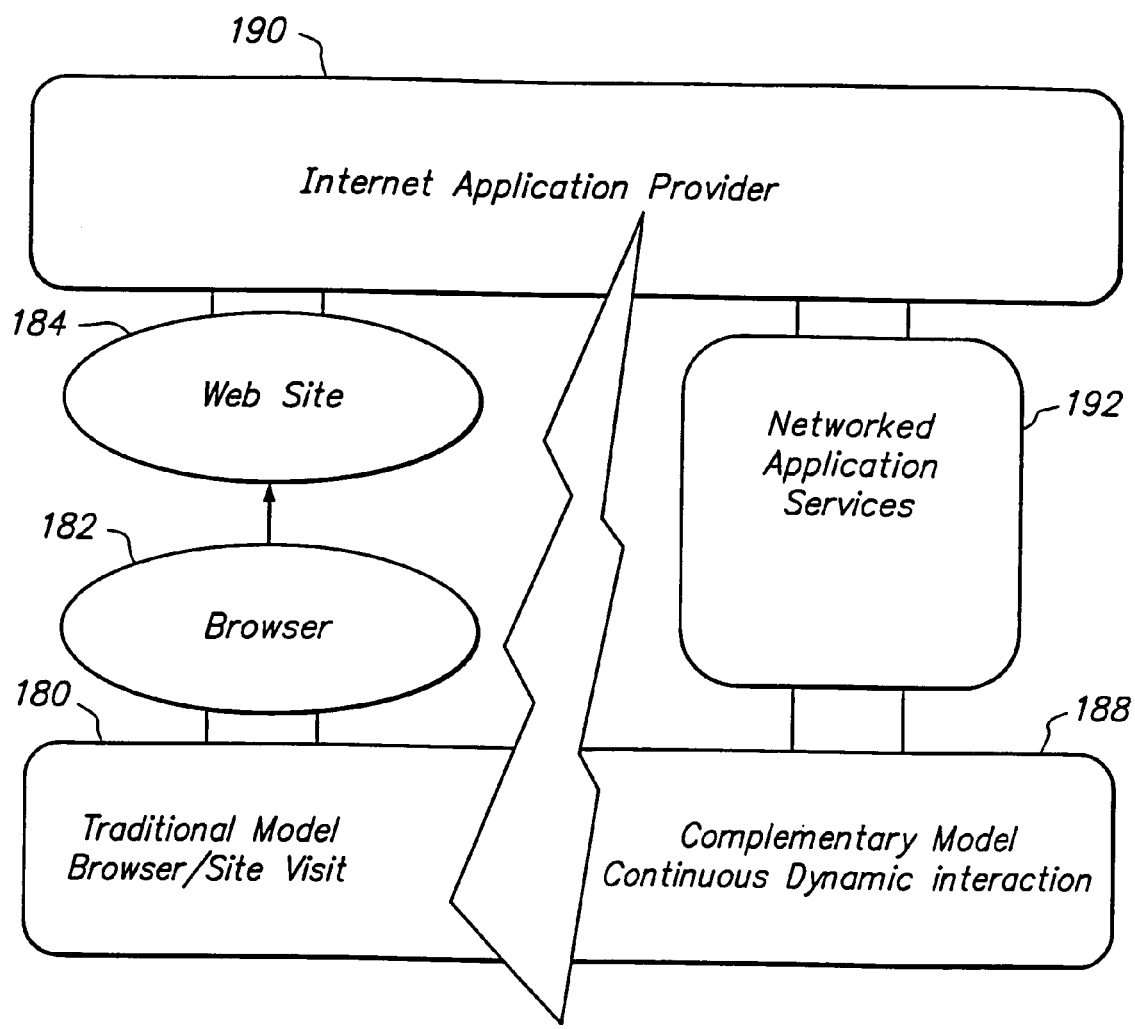
FIG. 7 is a diagram illustrating the interaction of the invention with the prior art web browser model.

FIG. 7 is a diagram illustrating the interaction of the invention with the prior art web browser model. The traditional model 180 uses a browser 182 to visit a Web site 184. In this model, the user is limited to contact with the selected active Web site. Furthermore, such contact can only be initiated and maintained during the actual visit to the Web site. This traditional model requires substantial device capabilities and has therefore been limited to computers and certain other devices such as Internet-capable telephones and personal digital assistants.

By contrast, the communication system according to the present invention 188 provides a complementary model to the existing Web site browser model to permit continuous direct and dynamic interaction 192 between an Internet application provider 190 and a user. Full integration can be provided between the user and the application. In addition, the communication system according to the present invention does not need the device capabilities required to operate a Web browser. As a result, the present invention is designed to be operable with all networked devices.

In the preferred embodiment, tracking mechanisms are built into the client software platform provided as a part of the present invention. These mechanisms can track such user behaviors as which part of an active window has been selected, which controls have been selected, as well as the number of selections of any designated components of the graphical user display according to the present invention. Therefore, the present invention can be used to accurately track the operations actually performed by users. This information is stored in the communication system message store for eventual delivery to selected entities, such as the Web site applications or market research analysts.

Each message that is passed to the message store is tracked. In the preferred embodiment, the user can determine the permissible level of tracking performed by the client software application. For example, the user can refuse permission to the communication system server for the user's viewing behavior to be tracked. In response thereto, a vendor may elect not to provide the user with a particular product. Different levels of tracking and responses thereto are therefore possible using the present invention.

The communication system according to the present invention uses a novel graphical user interface, herein referred to as a NetButton, to facilitate the transmission and receipt of messages across the electronic network. In the preferred embodiment, NetButtons virtually represent the applications that are used to interact with the electronic network. For example, in one embodiment, a NetButton can be used to graphically represent a particular topic. The user can manipulate this topic using the NetButton. A NetButton can be represented as a message and can therefore be transmitted to other devices on the electronic network.

As an example, a NetButton application can be created to permit the user to directly access a traffic camera picture that is displayed at a Web site. By selecting the NetButton, the traffic camera picture is accessed and displayed to the user. The user can also forward the NetButton to a second user so that this second user can similarly access and view the traffic camera picture.

In the preferred embodiment of the present invention, a user's desktop graphical user display includes a message window that lists the messages that have been received by the user or subscriptions for which the user is enrolled. These messages can include any objects including but not limited to NetButtons, text or graphical messages, or application data. The messages can be displayed by any suitable representation, including but not limited to a text list or icons.

An application display window displays a list of addresses on the electronic network. These addresses can be displayed, for example, as a text list, icons, or NetButtons. Thus, it is possible to display an icon for an individual, for a group of individuals, or for a device such as a fax machine.

A NetButton in the application display window is selected, for example by clicking, to open the application associated with the button. Messages including but not limited to URLs, audio files, and graphic images can be dragged onto these NetButtons. The application associated with the respective message type and NetButton is thereby performed. As an example, a graphic image dragged onto a NetButton for an image converter can be sent over the present invention to an application where it is converted to a different format, returned over the present invention to the sending device and displayed.

NetButtons can be stored on the user's client device, or in any networked location accessible to that client device. NetButtons can therefore be stored in the communications server of the present invention to be accessed by the user on demand.

In the presently preferred embodiment, the application window and message window can use well-known organizational features. For example, objects in these windows can be rearranged, clustered in folders, re-named, and re-sized. Files such as audio files can be associated with particular applications or players. Thus, a sound can be played when a specific NetButton is selected.

A user can select an object in the first window and drag the object to an address in the second window. The object will then be transmitted to the selected address. For example, if the object is a picture or an audio file, it can be transmitted to another person by dragging it onto that person's address or icon. Alternatively, the object can be dragged onto an address representing a device, such as a fax machine. In this case, the object will be sent directly to the selected fax machine.

A subscription can be similarly transmitted. Thus, if a user subscribes to a news service, an object representing the subscription can be selected and dragged onto a second person's address or icon. This second person is thereupon enrolled in the subscription service. In one embodiment of the invention, the object representing the subscription can be displayed to the second person as an invitation to enroll in the subscription. For example, a flashing icon or a sound can indicate the receipt of the object. The second person can then delete the received object, modify it, accept it to enroll in the subscription service, or forward it to yet another person.

In the preferred embodiment, one or more attachments, such as notes or voice messages, can be transmitted with the object. As with any message transmitted according to the present invention, rules and filters can be created and applied.

In the presently preferred embodiment, applications are grouped into four different levels according to their increasing levels of power and specificity. A Level Zero application places no application-specific code on the client—it is implemented solely on the application provider's server; messages are sent by that server using the present invention and accessed or displayed on the client using facilities provided by the present invention. A Level One application places some code on the client, and uses user input services provided by the present invention to allow the user to initiate, and to respond to, information and transactions. In the preferred embodiment of the present invention that code is compliant with the XML specification; however in alternative embodiments other encoding specifications can be used. In a Level Two application, the application provider writes application software that is operable on the user's device; that software communicates with corresponding software on the application server using the present invention. In the preferred embodiment of the invention, that client software will be written for a format native to the client device, such as Windows or Java; however in alternative embodiments any software runtime format would be used. A Level Three application is a stand-alone application that runs on the client separately from the communication system software but uses the communications system.

Figure 8:
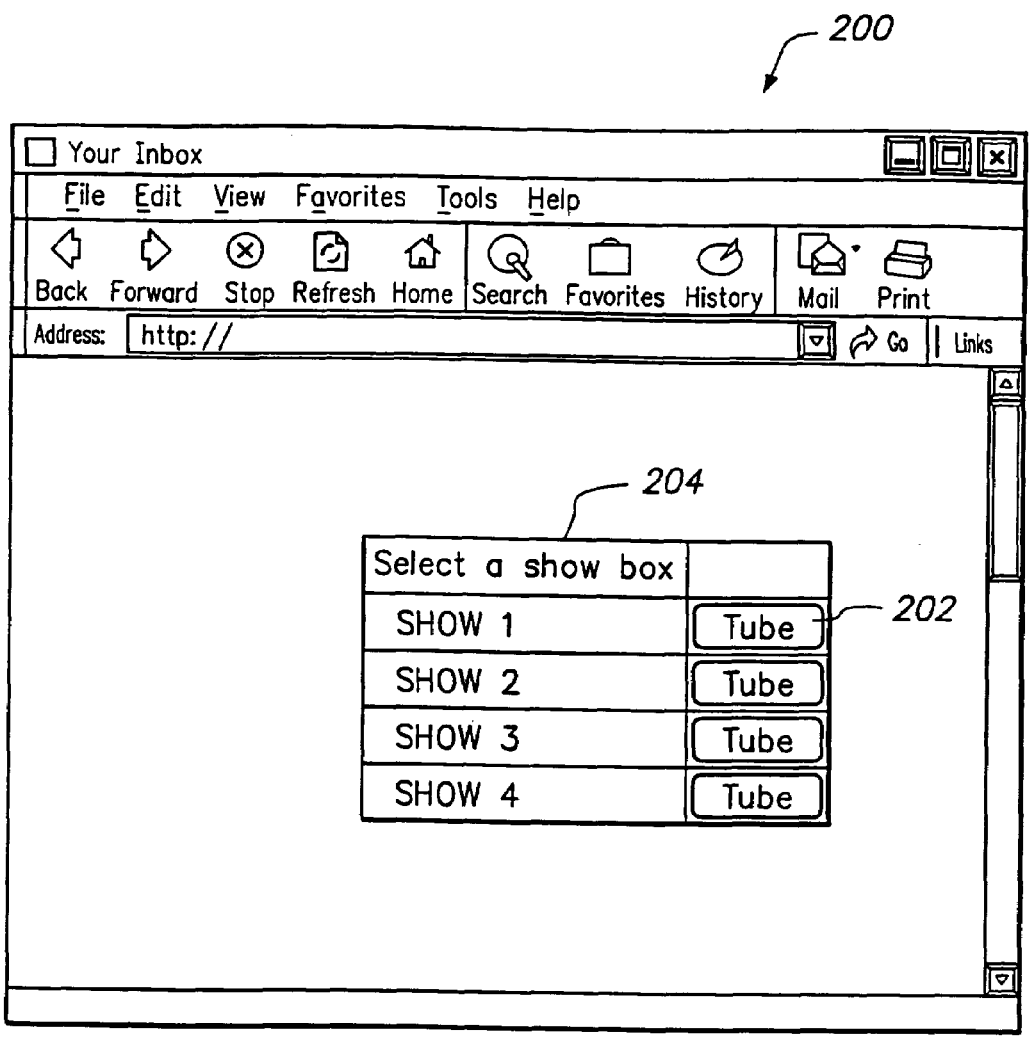
FIG. 8 is a graphical user interface illustrating a level zero application showing off-line information access according to one embodiment of the present invention.

FIG. 8 is a graphical user interface illustrating a level zero application showing offline information access according to one embodiment of the present invention. The FIG. 5 illustrates the asynchronous delivery of content, thereby increasing the speed of user interaction with the site and increasing the utilization of large-content elements such as audio and video. This application is capable of carrying an advertising payload. In addition, full publisher control over the use of content on the client can be maintained, for example by using save and forwarding permissions, or by defining a maximum lifetime of the content.

In the Level Zero application of FIG. 8, the Web page 200 has been modified to include a Tube delivery button 202 associated with each video program available on the Web page. In the embodiment illustrated in FIG. 8, the Web provider is a user of the communication system. The client Web provider is responsible for including the HTML instructions that describe the object (Tube delivery button).

A video can be downloaded and viewed by either selecting the button 204 representing the program, or by selecting the Tube delivery button 202 representing the program. If the program button is selected, the video content is streamed to the user. However, if the user has a slow connection, the quality of the video program may be poor. Furthermore, it may not be possible for the user to save the streamed video content for later viewing.

If the user selects the Tube delivery button, the video program is delivered to the user as a message according to the present invention. This message is delivered according to any rules and filters previously established by the user. The message routing capabilities of the present invention permit this message to be delivered to the user as soon as the user is online sufficiently long (either continuously or cumulatively) to be able to get the program downloaded in its entirety. At that point, the user is able to view, delete, or save the video.

Figure 9:
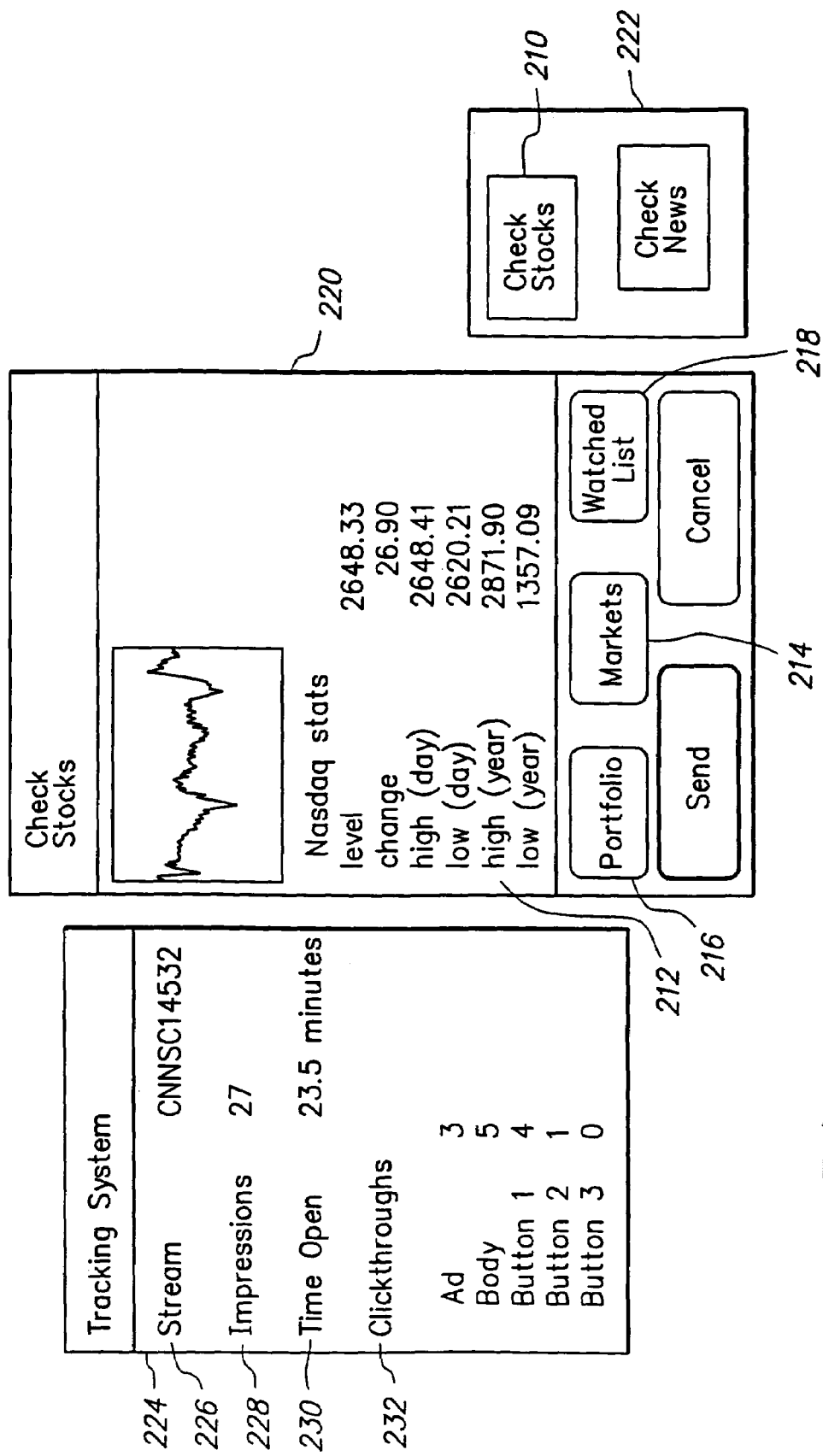
FIG. 9 is a graphical user interface illustrating a Level One application showing symmetric event driven communication according to one embodiment of the present invention.

FIG. 9 is a graphical user interface illustrating a Level One application showing symmetric event driven communication according to one embodiment of the present invention. Examples of such applications include but are not limited to a voice speaking accessory, a pager accessory, a graphic image viewer, and an audio file player. FIG. 9 shows symmetric support for client-driven and server-driven transactions, such as a client-driven switch to a different view or a server-driven update of a client display. A flexible, service-branded user interface can be permitted. In addition, precision user impression and response tracking can be provided.

In the example illustrated in FIG. 9, upon selecting the associated button 210, a Level One stock check application 212 is displayed within a window 222 of the graphical user interface. When the stock check application is selected, a larger window 220 is displayed presenting a constantly-updated view of stock market information from the Web provider. Unlike implementations based upon prior art, applications based on the present information can send such updates instantly as events occur. It is possible to dynamically switch the displayed information—in this example from stock market statistics to portfolio or watched stock statistics, for example by selecting display buttons 214, 216, 218 respectively.

The view of stock market information interacts between the application running on the client machine and the service running on the web. As the user makes changes to the portfolio or the watched stock list, this new information is transmitted to the provider and the requested new information is displayed.

FIG. 9 also illustrates a tracking system 224 according to one embodiment of the present invention. The tracking system collects and transmits back to the provider selected information regarding the user's use of the stock check application. In this example, the name 226 of the stream transmitted to the user is displayed, as well as other information including the number of impressions 228 of this stream and the length of time 230 the stream has been open. The exemplary tracking system also displays statistics 232 reflecting the parts of the stock check object that the user selected by clicking and the number of times each part was selected.

Figures 10, 11:
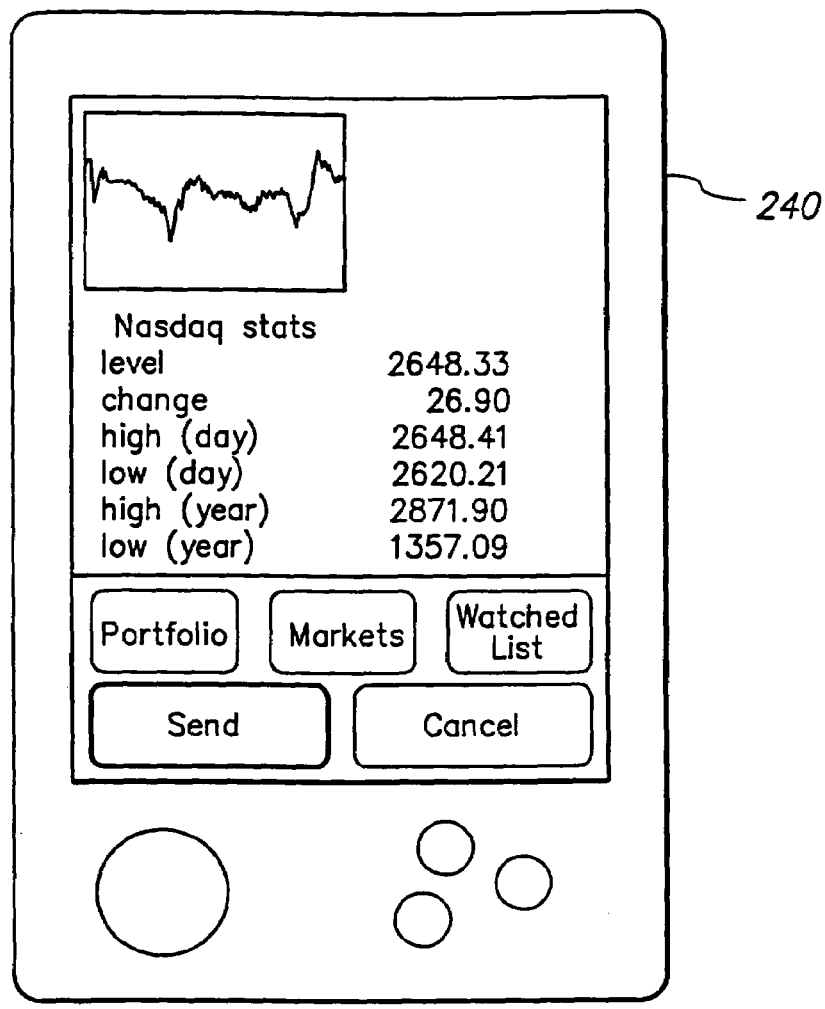
FIG. 10 is a graphical user interface illustrating symmetric event driven communication for non-PC devices according to one embodiment of the present invention.
FIG. 11 is a graphical user interface illustrating integration of a Level One application according to the present invention with a networked prior art message service application.

FIG. 10 is a graphical user interface illustrating symmetric event driven communication for non-personal computer devices according to one embodiment of the present invention. FIG. 10 shows the same Level One application 212 as that illustrated in FIG. 9, but running on a personal digital assistant ("PDA") 240. In this example, no Web browser is required, but the PDA provides the same screen display and information as did the personal computer of FIG. 9. This Figure illustrates the use of a device-appropriate user interface. There is direct integration between the client and the server application, with no need for a Web browser on the client. In addition, there is no application-poll communication load.

FIG. 11 is a graphical user interface illustrating integration between a Level One application according to the present invention and a networked prior art message service application. FIG. 11 shows instant, event driven updating. A return channel allows both tracking and confirmation. In addition, response capabilities build into base standards. In this example, when a message to the user, such as a voice mail, e-mail, or fax, arrives on the provider's server, the provider sends a notification 250 to the user using the communication system according to the present invention. The communication system permits the provider to interact with the user to notify the user of events that have occurred on the provider's server. The user must then separately access the message service to retrieve any messages.

Figure 12:
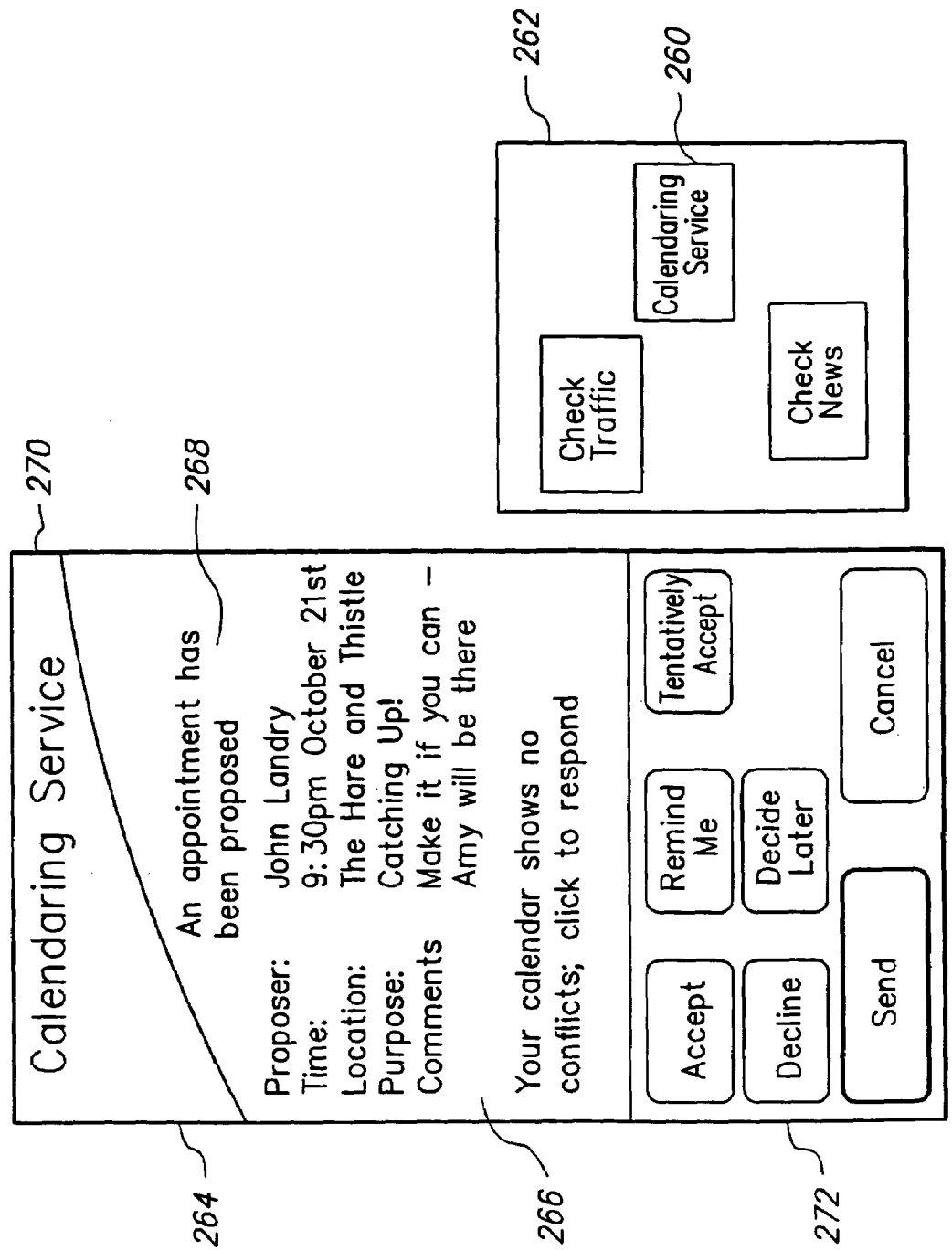
FIG. 12 is a graphical user interface illustrating integration of a Level One application according to the present invention with a networked calendaring service application.

FIG. 12 is a graphical user interface illustrating integration of a Level One application according to the present invention with a networked calendaring service application. In this example, the user can select the icon 260 that represents the calendaring service that is shown in the application window 262 on the user's desktop. A window 264 is then displayed presenting the calendaring service application 266.

In this example, the user is notified of a proposed meeting by the delivery of a message 268 using the present invention; that message is used by the application to update the calendar with the new information. In one embodiment of the invention, the object displays the service provider's branding 270. In the example provided in FIG. 9, the user is permitted to interact with the service provider by selecting displayed responses 272 that are transmitted back to the service provider.

In the preferred embodiment of the present invention, a plurality of windows displaying different applications can be open and active on the user's desktop at the same time. However, in alternative embodiments, only one such window can be active at a time.

Figure 13:
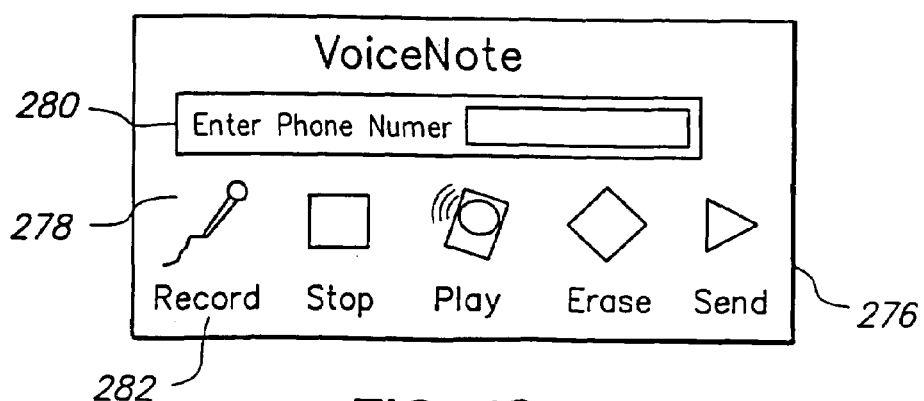
FIG. 13 is a graphical user interface illustrating a Level One NetButton according to the present invention.

FIG. 13 is a graphical user interface illustrating a Level One NetButton according to the present invention. FIG. 13 shows an appliance user interface that is simple, focused, and intuitive. A click-through feature permits access to the application Web site to allow fulfillment of non-standard and complex requests. In this example, a NetButton 276 is used to represent an application 278 for a multimedia email delivery system. This application is designed to enable the user to record and send a voice mail to a designated phone number 280. If the user wishes to carry out some other task, access to the mail service Web site is provided through an icon 282 displayed within the NetButton. By selecting this button, the user's Web browser is activated, if necessary, and the user can access the Web site to perform activities not supported by the NetButton application.

In a Level Two application, the application provider writes software that is operable on the user's device. For example, a pager company can create a Level Two software application that displays a page on the user's desktop, as well as on the user's pager. In this example, the Level Two application functions as a desk accessory rather than as a complete software application.

Figure 14:
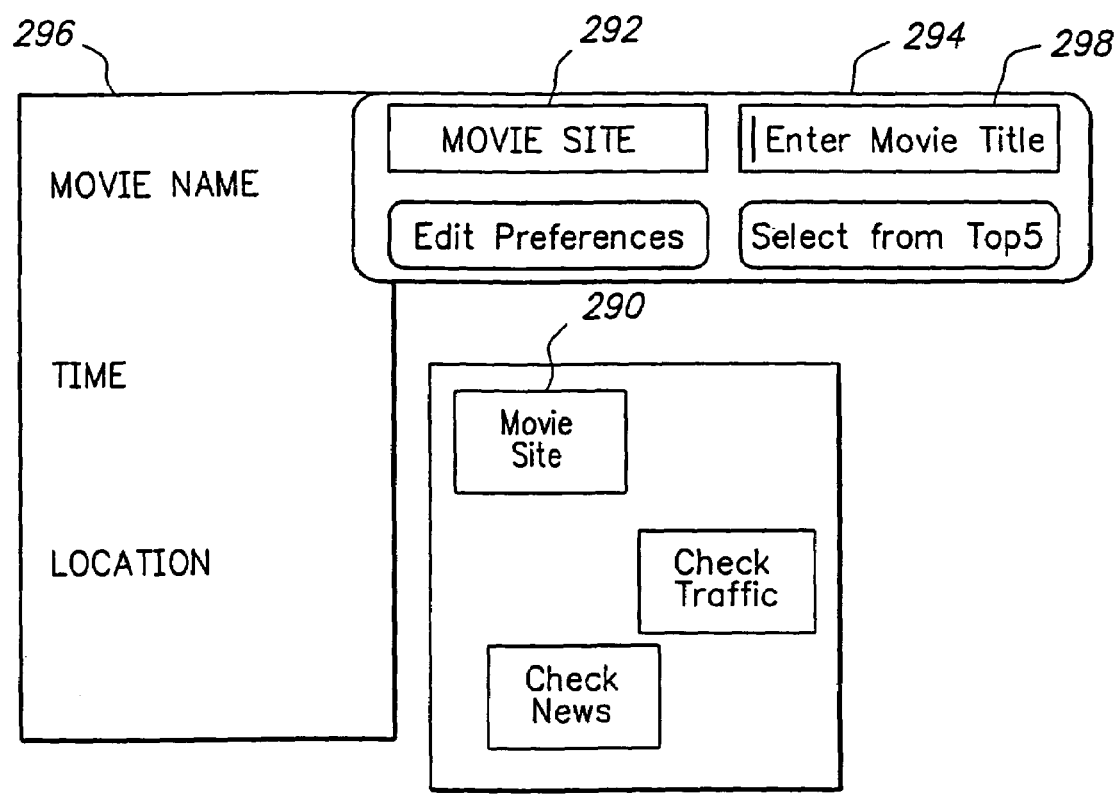
FIG. 14 is a graphical user interface illustrating integration of a Level Two application according to the present invention with a web site.

FIG. 14 is a graphical user interface illustrating integration between a Level Two application according to the present invention and a Web site. In this example, the invention allows the creation of focused sub-sets of application site functions. Fully bi-directional communication allows flexible, on-line and off-line operation. The communication system according to the present invention can be used to create focused subsets of Web site functions. For example, a NetButton can be created to provide the user with information and services that the user accesses frequently. In the example illustrated by FIG. 14, a NetButton 290 is created for a movie schedule Web site. When the appropriate NetButton 292 in the application display window 294 is selected, a Level Two application window 296 is opened. In this application window, the user can find out the time and location for a selected movie. In the preferred embodiment, the Level Two application can be configured, such as through preference editing, to modify the parameters of the application. Thus, the user can use the Level Two application to find movie schedules for any particular date(s) or location(s) as desired.

To receive additional information from the Web site, the user can access the Web site by selecting a control 298 provided in the application window. If the user has an active Web browser running, the browser will be directed to the selected Web site. If the browser is not active, selecting the button will open the Web browser application to the selected Web site.

Figure 15:
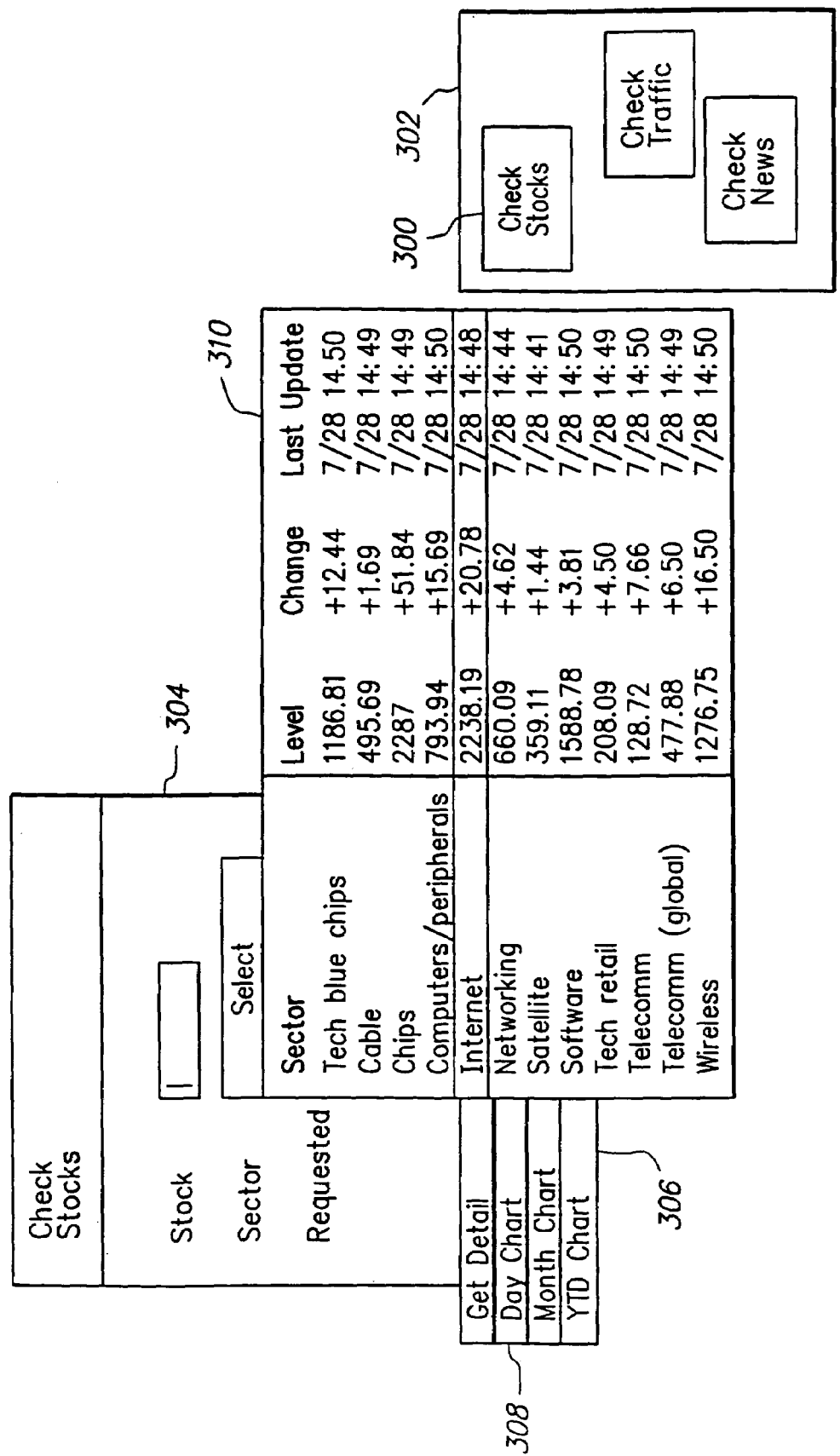
FIG. 15 is a graphical user interface illustrating a Level Two application for a client-driven transaction according to the present invention.

FIG. 15 is a graphical user interface illustrating a Level Two application for a client-driven transaction according to the present invention. In this example, selecting the NetButton 300 in the application display window 302 opens an application 304 that provides a greater level of user flexibility and control than the analogous Level One application illustrated previously with respect to FIG. 9. The Level Two application of FIG. 15 supports features such as complex drop-down menus 306 and permits the user to select a sector 308 and request various data charts 310 related thereto.

Figure 16:
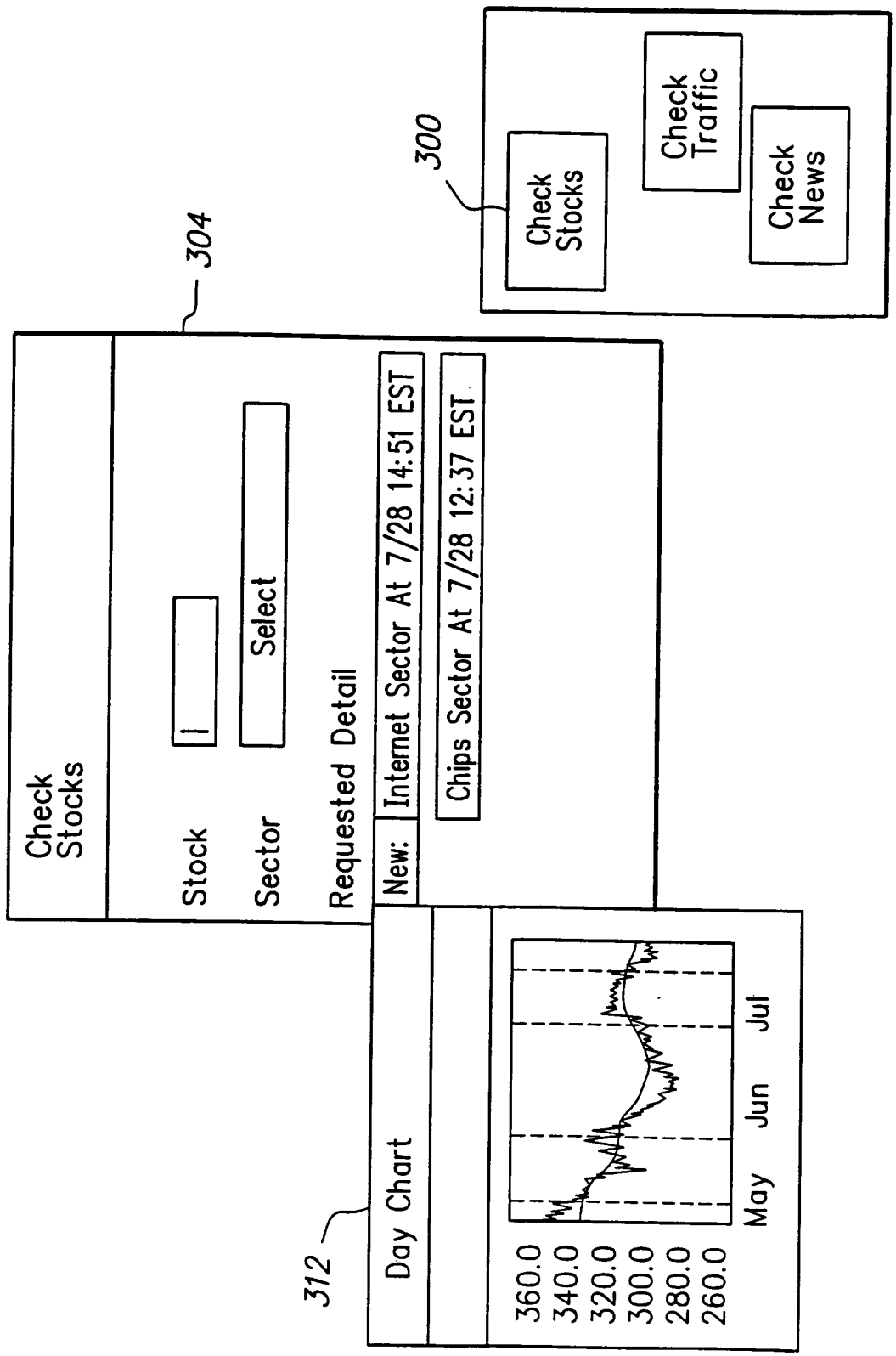
FIG. 16 is a graphical user interface illustrating a response to a client-driven transaction using a Level Two application according to the present invention.

FIG. 16 is a graphical user interface illustrating a response to a client-driven transaction using a Level Two application according to the present invention. This Figure shows an example of a response 312 to a request for information as described in the example of FIG. 15.

A Level Three application is a desktop application that runs separately from the communication system software. The communication system software, however, provides the signal transfer mechanism for messages transmitted using the Level Three application.

FIG. 17 is a graphical user interface 320 illustrating integration of a Level Three application according to the present invention with a networked prior art message service application. The Level Three application permits the user to listen to voice mail messages 322, to erase them 324, and to save them 326. This Level Three application provides more functionality and flexible application power than the Level One message server application previously described with respect to FIG. 11.

The following example is a comparison of electronic commerce merchandising according to the prior art and according to the present invention. In this example, a bookstore has determined that sales of mystery books have fallen below their desired minimum sales levels. As a part of a marketing plan, the bookstore has decided to offer special discounts to their customers for restricted periods of time.

FIG. 18 is an eCommerce sales merchandising system 330 according to the present invention. In FIG. 18, buttons indicating all platinum level customers residing in the Pacific region are to be offered a 20% discount on mystery book purchases during a four hour period 334, 336, 340, 332, 338 respectively. The impact of the discount can then be assessed.

Figure 19:
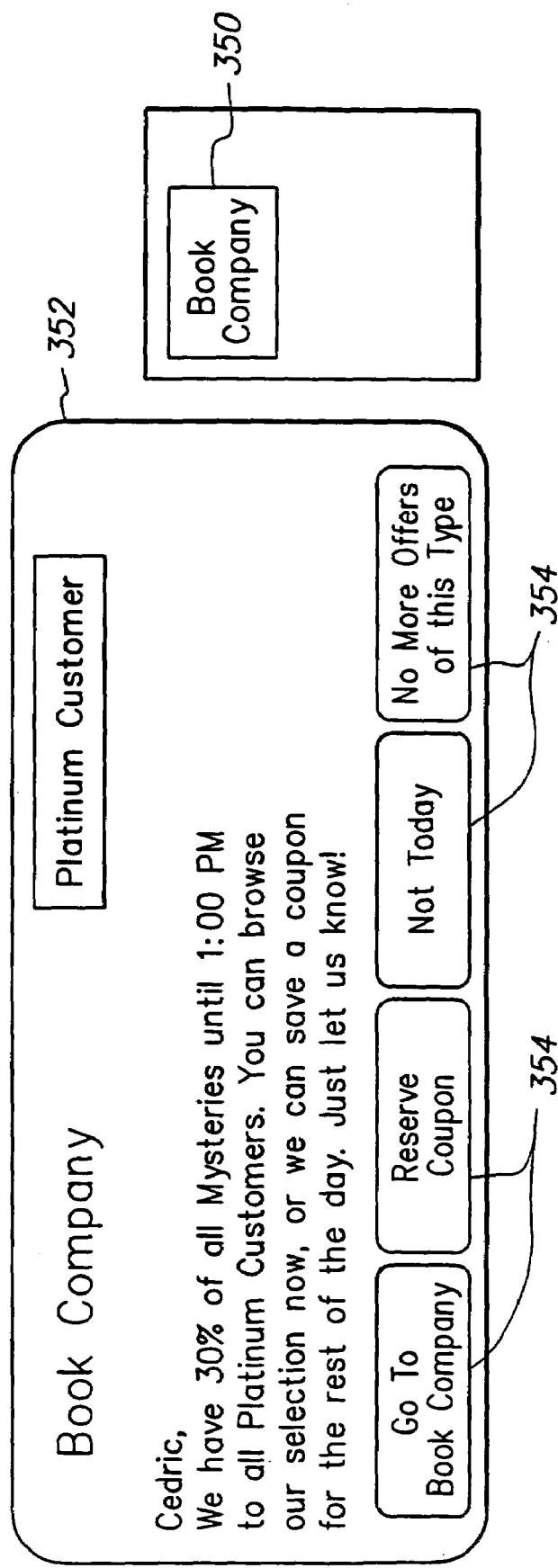
FIG. 19 is an eCommerce sales merchandising system according to the present invention.

FIG. 19 is an eCommerce sales merchandising system that can be integrated with the present invention. The communication system according to the present invention enables a bookseller or any eCommerce vendor to transmit this promotional information to platinum customers by clicking a button. In this example, a platinum customer has a NetButton 350 for the bookseller displayed on the desktop of the customer's personal computer, or other networked or addressable device. When the promotional information is received by the customer, the customer's NetButton can be configured to provide a notice of the receipt of the message, for example by flashing. If a customer selects the NetButton during the promotional period, an application window 352 notifying the customer of the promotion is opened. In the example illustrated in FIGS. 18 and 19, a Level Two application is used to provide this notification. The customer can elect to respond to the promotional offer through the mechanisms 354 enabled by the Level Two Application, or can elect to open a Web browser to respond to the promotional offer through the bookseller's Web site. The present invention thereby provides a two-way interactive instant messaging system for communication between a customer and an eCommerce Web site, minimizing the likelihood of inappropriate or expired communications.

One feature provided in the preferred embodiment of the present invention is an interface to the underlying interactive connections of the communication system. This interface, referred to herein as a "TubeTop" is an iconic representation of a permanent connection, referred to herein as a "Tube", to at least one other address on the electronic network. It is possible to use the TubeTop and Tube system to exchange messages between points on the electronic network e.g. to a user or to a particular device. The present invention provides two types of basic connectivity capabilities. A Tube is a one-to-one connection for bi-directionally publishing and receiving messages. A second type is a one-to-many architecture, referred to herein as a "pool".

Figure 20:
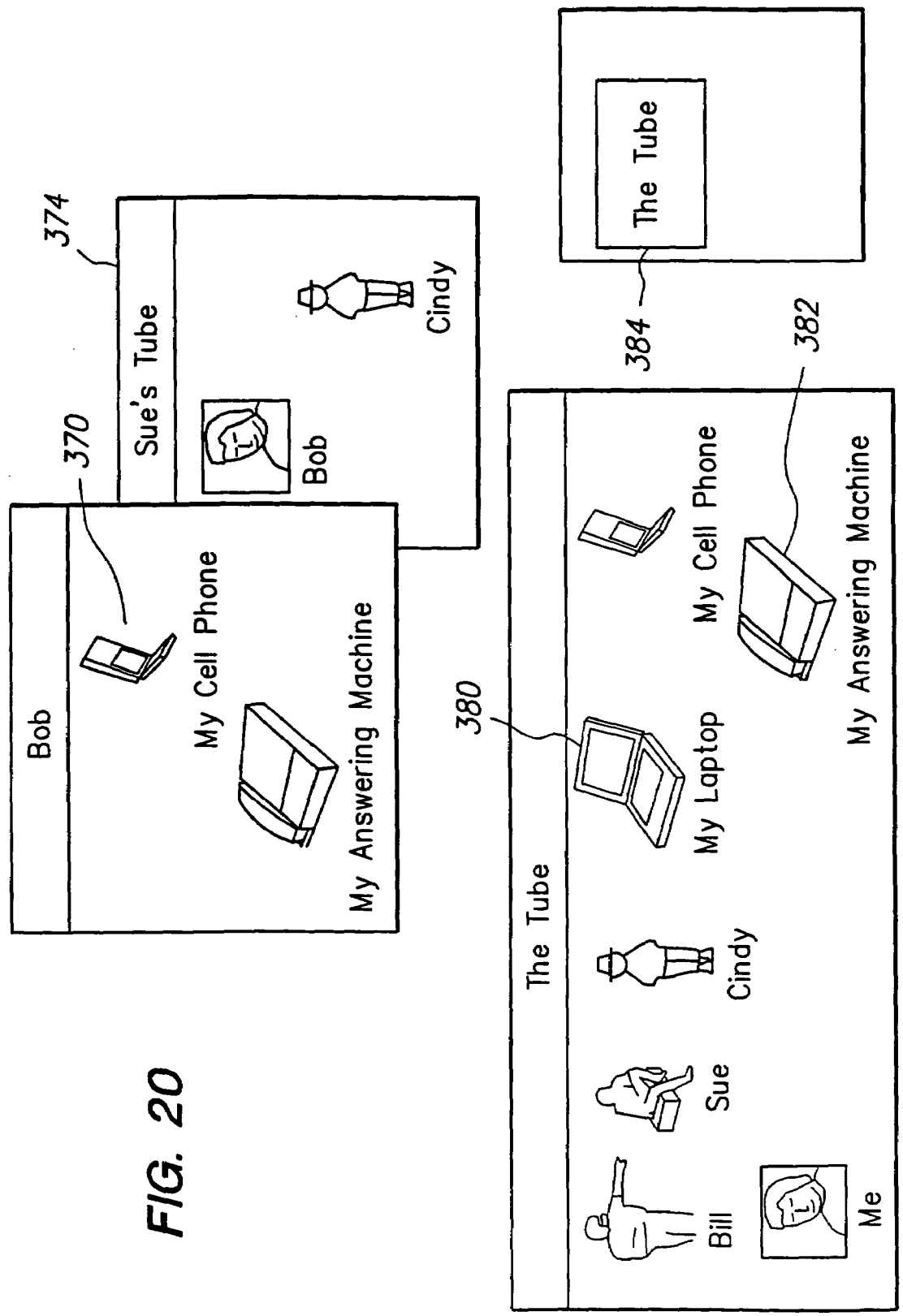
FIG. 20 is a graphic user interface display illustrating Tube connection according to the present invention.

FIG. 20 is a graphic user interface display illustrating Tube connection according to the present invention. In this example, a first user, "Bob", can enable one or more other users to be able to send a message to the first user's cell phone by dragging the cell phone NetButton 370 onto the NetButton(s) for the other user(s). Thus, if the first user drags the cell phone NetButton onto the NetButton 372 for Sue, then Sue will receive through her Tube 374 a NetButton (not shown) for the first user's cell phone. Sue can then use this cell phone NetButton to send information to, and receive information from, the first user's cell phone.

The TubeTops according to the present invention can be used to represent with icons or NetButtons any individual person, groups of people, or device on the electronic network, including but not limited to a laptop computer 380, cell phone, or answering machine 382. These icons or NetButtons represent the ability to send information to or receive information from the respective people, topics, or devices through the communication system.

It is possible to select a particular device to which a message will be sent, such as the cell phone of the previous example. Alternatively, the message can be dragged onto an icon representing a person. The message will then be delivered to any appropriate sub-address of that person according to the type of the message, as described previously. Thus, the communication system according to the present invention would deliver a telephone message to the selected user's telephone, while a fax message would be directed to the user's fax machine.

The TubeTop 384 is essentially a defined standard interface sitting "on top" of a Tube and that leverages all of the Tube's abilities to send and receive objects interactively to enable appliance-like applications to interact and deliver any kind of focused functionality The TubeTop feature according to the present invention can readily be used to facilitate topic-based communication. For example, a group of individuals who subscribe to a chess game topic would each have a chess game TubeTop on their desktop. When one participant moves a chess piece, each subscriber to the topic will receive this information and will view the move upon establishing communication with the electronic network.

The TubeTop feature can be used as an interface to particular functions or services. For example, a TubeTop can be provided to a language translation service. A document dragged onto this TubeTop icon is transmitted to the translation service. The translation service can then return the document by responding to the original message, or by any other known means. This feature is especially advantageous for eCommerce because it permits a vendor, such as the language translation service, to readily charge a fee for each service performed, and to automatically track such transactions.

In another example of Tube delivery, a TubeTop can be provided for a shipping service. A document dragged onto the TubeTop can be printed by the shipping service, assigned a tracking number, and then delivered to the intended party.

Figure 21:
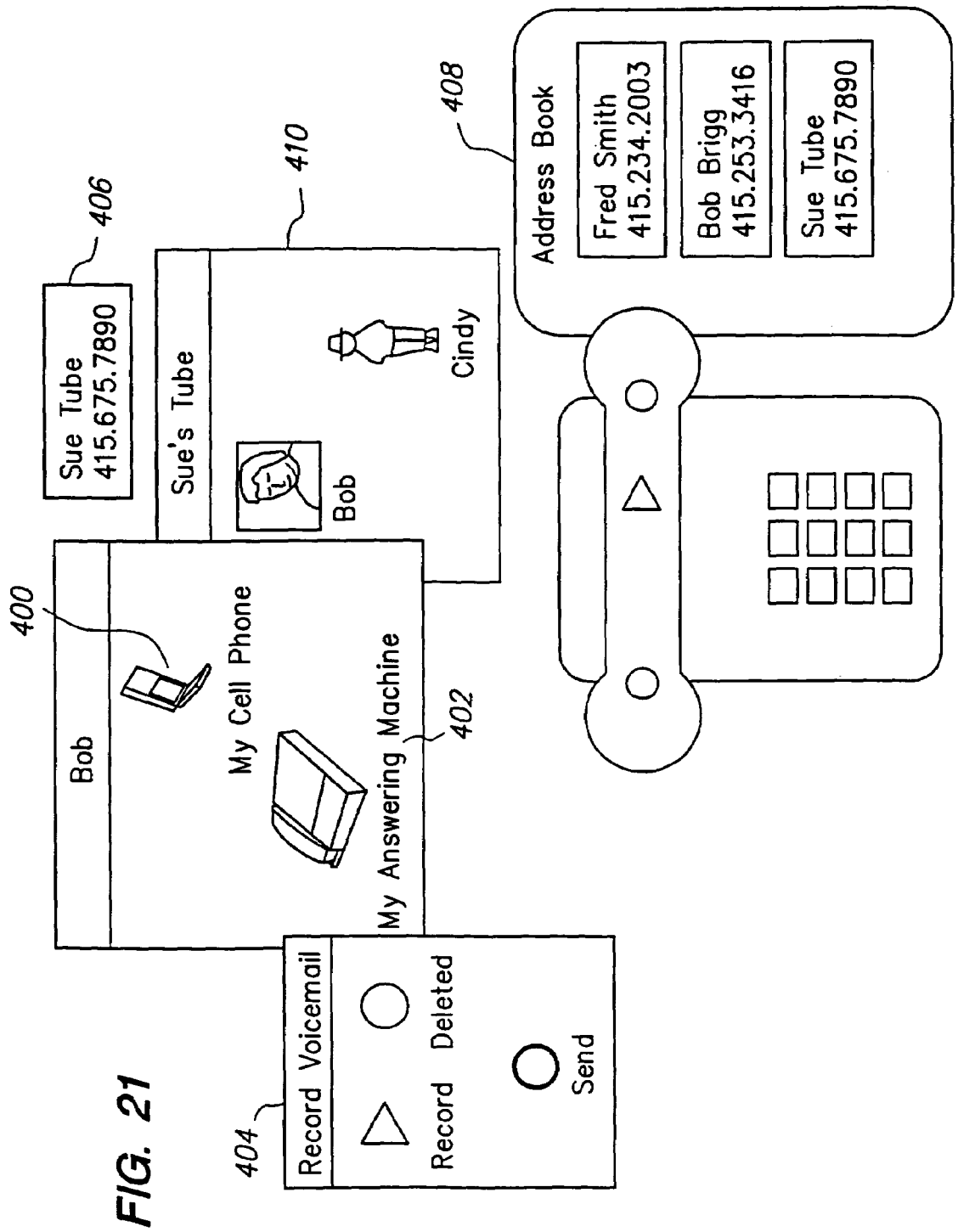
FIG. 21 is a graphic user interface display illustrating Tube connection with intuitive, device-level addressing according to the present invention.

FIG. 21 is a graphic user interface display illustrating Tube connection with intuitive, device-and-application-level addressing according to the present invention. When a TubeTop 400 NetButton is selected, an application window appropriate to the respective NetButton opens. For example, selecting a NetButton 402 for an answering machine will open an application window 404 that permits the recording of a message to be delivered to the answering machine.

The Tube delivery feature can be used to transfer information directly to a file or to an application. For example, a first user can transfer a contact address 406 directly to a second user's address book application by dragging the contact address onto the second user's TubeTop 410. The message type is then recognized and the message is delivered to the second user's address book application 408. Alternatively, a TubeTop can be provided for the second user's address book itself.

Figure 22:
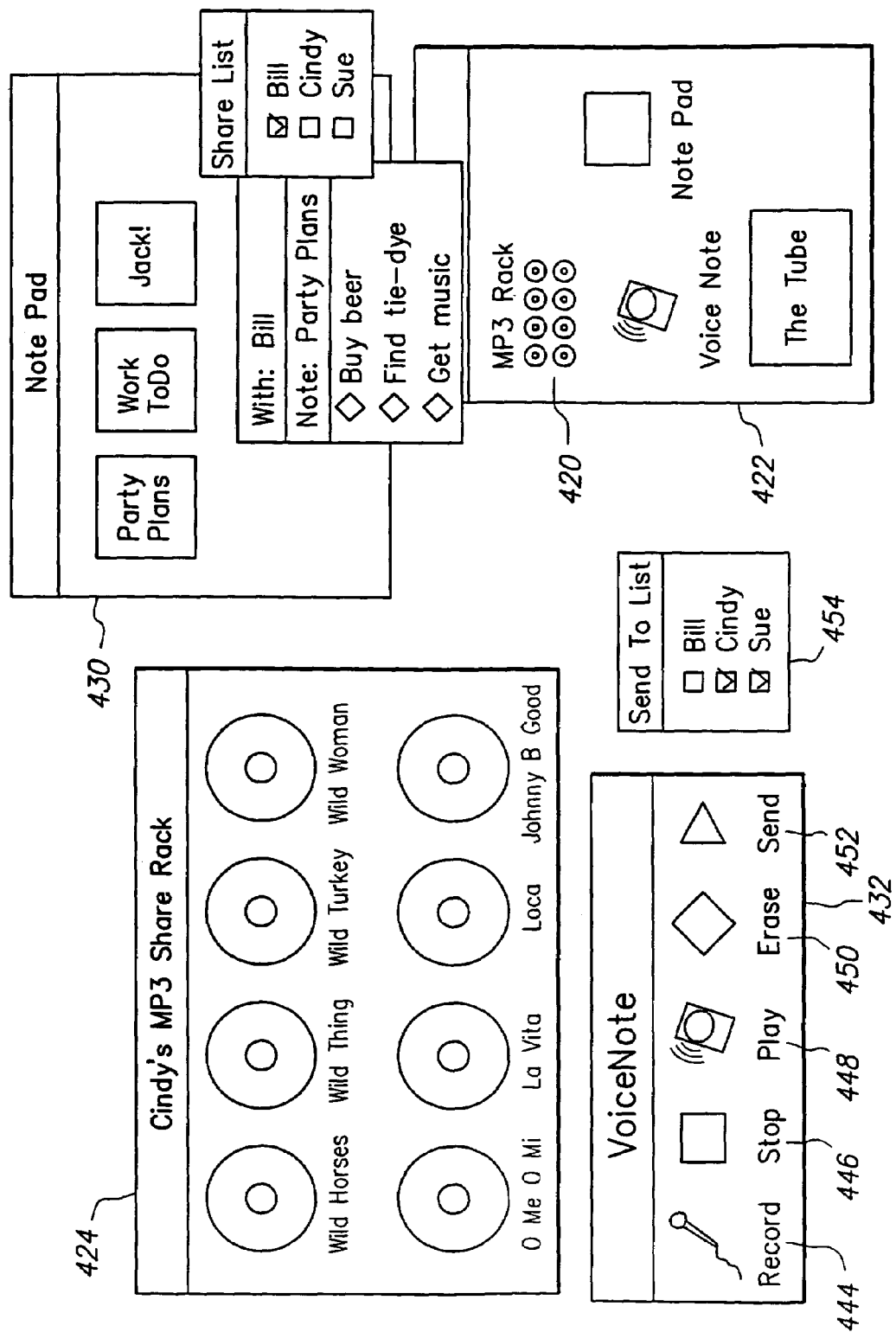
FIG. 22 is a graphic user interface display illustrating personalized Tube connection according to the present invention.

FIG. 22 is a graphic user interface display illustrating personalized Tube connection according to the present invention. FIG. 22 shows examples of three different types of TubeTops. One type is an MP3 rack TubeTop 420. When the MP3 rack TubeTop is selected from the application display window 422, an application window 424 with a shared rack representing a set of MP3 audio files is opened. An MP3 file that is dragged onto the MP3 shared rack is delivered to every other device that has that MP3 application rack. This type of TubeTop permits users to build and share mutual collections of MP3 files. One skilled in the art will readily recognize that this type of TubeTop is not limited to audio files. Rather, this type of TubeTop can be used to build mutual collections of any type of message that can be transmitted over the electronic network, including but not limited to graphic files, text files, addresses, and Web site uniform resource locators ("URLs").

In another type of TubeTop 430, the Tube delivery feature can be used to share information. Thus, party planning notes can be shared with some or all of a group of people. Any person who is sharing the notes can write additions to the notes. These additions are instantly shared with all other persons who are sharing the party planning notes. The third type of TubeTop 432 shown in FIG. 22 is a voice note application. This application enables a user to record 444, stop recording 446, play 448, erase 450, and send a voice note 452 to a selected person(s) 454.

Figure 23:
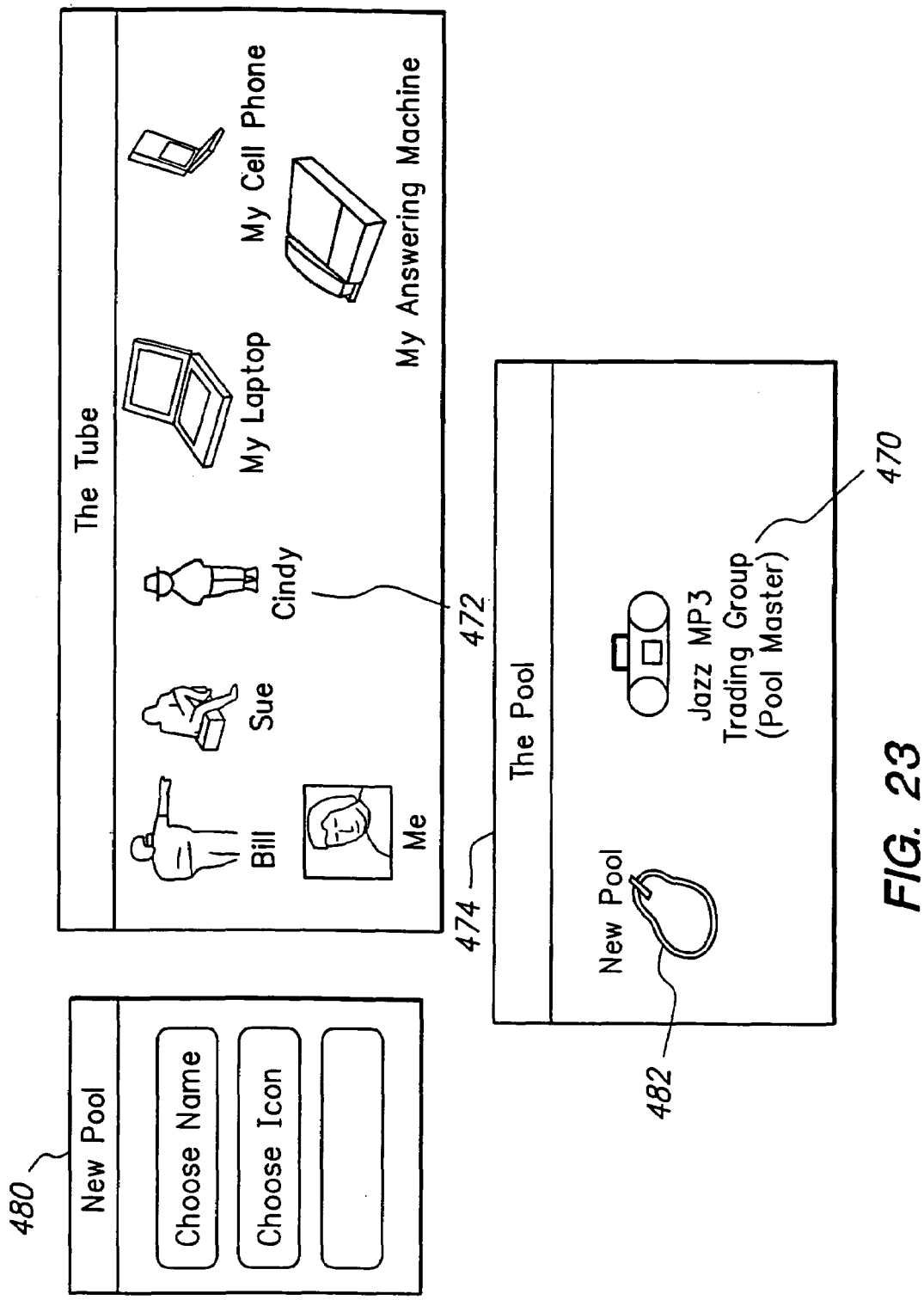
FIG. 23 is a graphic user interface displaying one-to-many communications using a Tube connection according to the present invention.

FIG. 23 is a graphic user interface displaying one-to-many communications using a Tube connection according to the present invention. FIG. 23 illustrates an example of a topic or a stream to which a plurality of people (referred to as a "pool" 474) have subscribed, the jazz MP3 trading group. The icon for the jazz MP3 trading group 470 can be dragged onto a Tube 472 for a user of the communication system to invite that user to join the trading group. If this invitation is accepted, then all information that is shared with subscribers of the trading group is delivered also to the new subscriber through Tube delivery. In alternative embodiments, subscriptions to a group can be initiated using Tube delivery while information is delivered by any known means, such as by e-mail.

In addition, a message, such as an MP3 that is dragged onto the trading group icon is sent to each subscriber of the group. FIG. 23 therefore illustrates delivery of one to many, or "pool" communication. An application 480 for creating a new pool and activated using a NetButton 482, can also be provided.

Figures 24, 25:
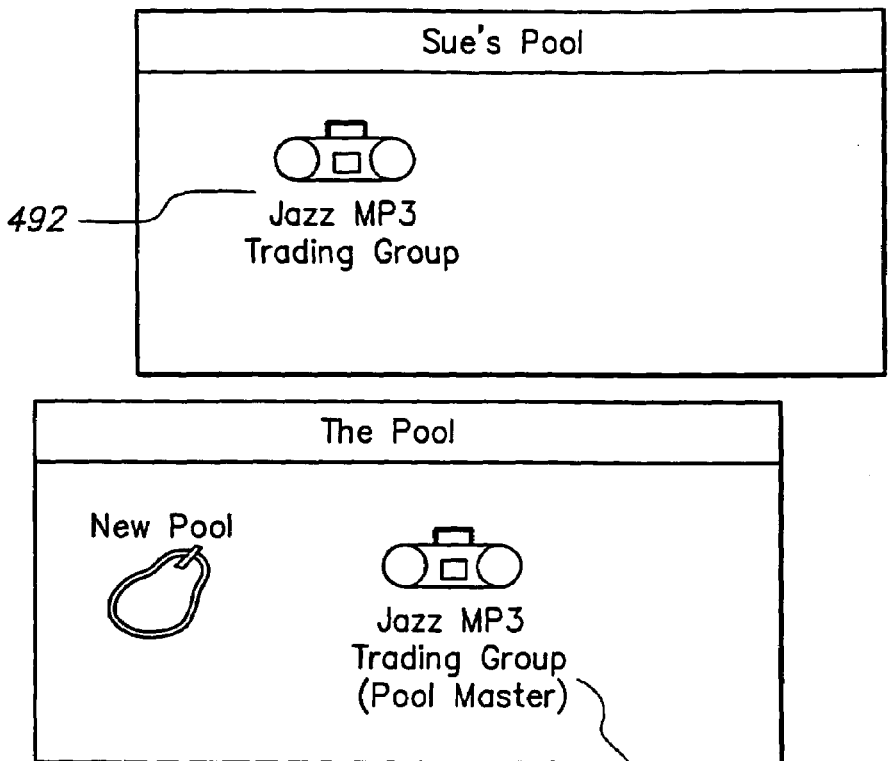
FIG. 24 is a graphic user interface display showing moderated personalized Tube connection according to the present invention.
FIG. 25 is a graphic user interface display showing communication of an application created according to the present invention.

FIG. 24 is a graphic user interface display showing moderated personalized Tube connection according to the present invention. In this example, a moderator, referred to in this example as a "pool master" 490 controls any restrictions on publishers to and subscribers of the group 492. The moderator can be a person or can be a software application, such as a filter. For example, the moderator can retain the exclusive right to invite new subscribers "into the pool," i.e. to join the group. The moderator can also control the messages that flow into and out of the group by designating who is authorized to publish messages and who is authorized to receive certain messages. It is therefore possible to provide moderated exchanges in which, for example, confidential information is distributed only to authorized parties.

The communication system according to the present invention can be used to enable users or small eBusinesses to create a micro publishing application. FIG. 25 is an illustration of application creation according to the present invention. In this example, Bob is the host of a "webcam" show in the Internet and wishes to notify subscribers that his show I will begin in 15 minutes.

One prior art method for providing this notification is by sending e-mail messages to each subscriber, However, this method is only effective if the subscribers actually receive and view the e-mail messages prior to the commencement of the show. Furthermore, the email messages that are not timely viewed can remain in a subscriber's message box as unnecessary clutter.

However, the communication system according to the present invention supports Internet or client-based application creation. Bob can log to the Web and use the communication application creation page 500 to describe parameters 502 for the notification. For example, Bob can indicate whether or not he wants to retain exclusive control over the subscription list, the lifetime of a message, the levels of desired required or requested, if any. Thus, the notification can be configured to be deleted or replaced once the show to which it refers has ended.

In addition, the communication system enables setting up the icons and other characteristics that are associated with the new application. For example, one icon can be associated with a subscription. Characteristics such as notification alarms, or sounds can therefore be selected.

Figure 26:
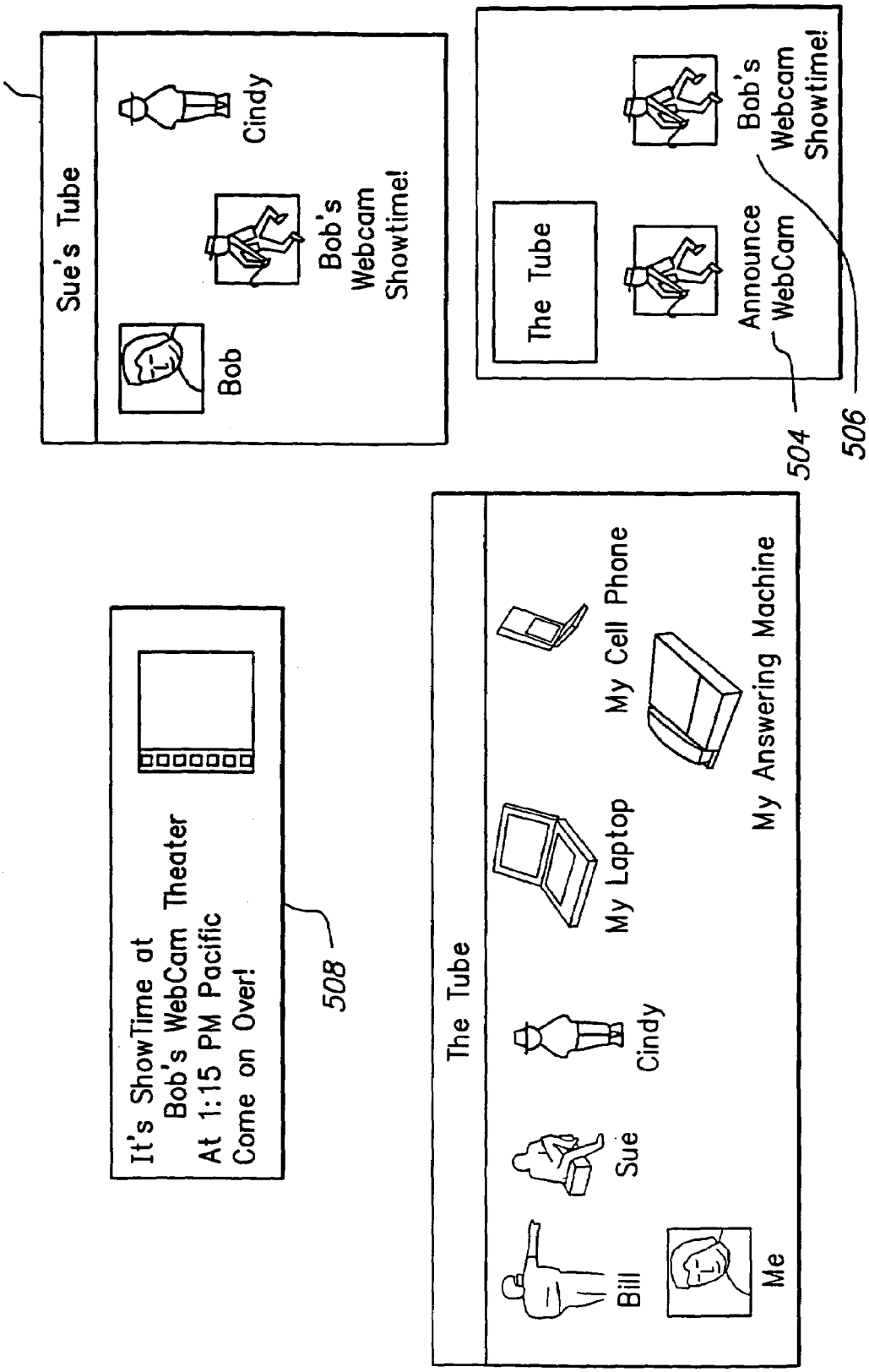
FIG. 26 is a graphic user interface display showing communication of an application created according to the present invention.

FIG. 26 is a graphic user interface display showing communication of an application created according to the present invention. The example of FIG. 26 assumes that a new application has been created as described with respect to FIG. 25. In this example, two icons are created—a subscriber object 504 and a publisher object 506. The subscriber icon is used to invite persons to be subscribers to the stream, in this case, the webcam show. The publisher object allows a person to send information to that stream. Any information in any form that is dragged onto the publisher object is distributed to all of the subscribers 510 to the stream. In the context of a webcam show, for example, any messages 508 that are dragged onto the publisher object are sent out to the subscribed audience, to advise them that the show is about to begin.

While the invention is described in conjunction with the preferred embodiments, this description is not intended in any way as a limitation to the scope of the invention. Modifications, changes, and variations which are apparent to those skilled in the art can be made in the arrangement, operation and details of construction of the invention disclosed herein without departing from the spirit and scope of the invention.

In the preferred embodiment of the present invention, a digital signature is required for entry of a message into the system. This feature can be used to minimize, if not to entirely eliminate, spam messages. A well-known system, such as that implemented by Verisign can be used to authenticate the digital signatures. Encryption, such as a public/private key system can also be used to further insure the security of message transmission according to the present invention.

The communication system server according to the preferred embodiment of the present invention can additionally provide transform capabilities at the communication system server. Thus, as objects are transmitted through the system, the communication system server can be used to perform arbitrarily complex transformations on these objects to provide value either to the message publisher or to the recipient. These transform capabilities can be implemented using software applications created either by the communication system server operator or by any other users in communication therewith over the electronic network. Alternatively, these transform capabilities can be implemented using applications installed in or accessible to user devices, such as an application stored on the user's desktop computer.

For example, the communication system server can be configured to provide a format translation for a message. Thus, a publisher can send a message in a first format with an instruction that the message is to be delivered in a second format. The communication system server will then translate the message format and transmit the resulting message to the intended recipient. Other transform capabilities that can be provided in the present invention include but are not limited to localizing or translating a message's language.

In one embodiment of the invention, interactive applications on a client device can be configured to permit interactive communication among the applications. For purposes of explanation only, this embodiment of the invention will be described with respect to NetButtons. However, one skilled in the art will recognize that these teachings can also be applied to any type of active applications having client-side logic that permits interapplication communication or interactive communication across an electronic network, including but not limited to streaming audio and video applications. In addition, while only one page of a prior art Web browser can be active at a time, it is possible to use the present invention to provide interapplication communication between an active Web site, as viewed using a Web browser, and another active application such as a NetButton or streaming audio application. While the teachings of the invention can be applied to interapplication communication between different Web sites, there will be a time delay in communication as the inactive application is made active.

This embodiment of the invention differs from the prior art dynamic data exchange method of communication because it uses a common semantic and syntactic specification that is mutually understood between the communicating elements and is defined for personal, eCommerce or eBusiness use. In the preferred embodiment, those semantics are defined within a well-known standard syntax such as XML. This set of semantics is used to broker communication and transactions among the applications on the client. In alternative embodiments, the communication can be enabled using other language specifications. When this communication among applications occurs on the same client device, the communication can occur both when the user is on-line or off-line. When the user is on-line, the applications can query their respective home web sites, or eCommerce applications, or applications on other client or server devices to update any offers or information.

In the invention, an interactive application such as a NetButton is able to publish certain information by making this information available, preferably selectively, to other applications located on the same client device. In the example of an on-line pharmacy application, the application can publish information included but not limited to the name of the vendor, the applications that are permitted to receive the published information, a product being offered for sale, and an offer code number to access the for-sale product. In the preferred embodiment, this information is published in semantics which are compliant with the syntax of the XML language.

Another type of information that can be published by a NetButton is an identification of which other NetButtons are permitted to receive this published information. Thus, for example, a company can publish information only to Net-Buttons of related or allied companies. This provides a level of security for the published information.

Figure 27:
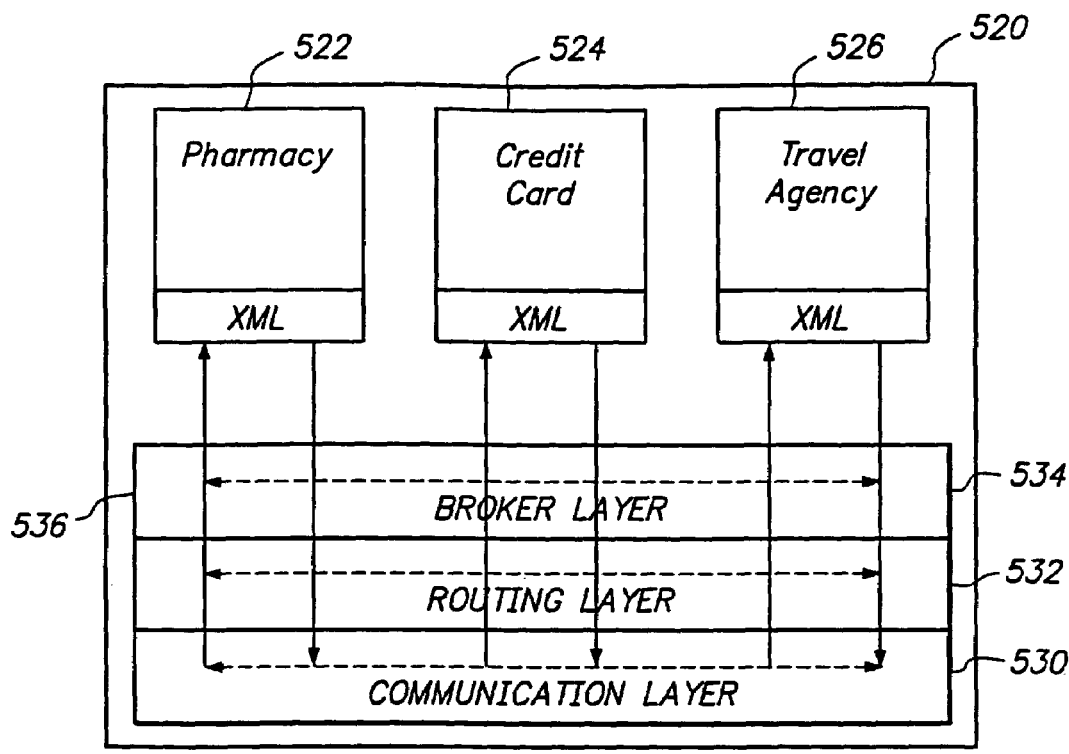
FIG. 27 is a system diagram illustrating communication among applications on a processing device according to the present invention.

FIG. 27 is a system diagram illustrating communication among applications on a processing device according to the present invention. In the example illustrated by FIG. 27, the client device 520 includes NetButtons for an on-line pharmacy 522, a credit card company 524, and for an on-line travel agency 526. These NetButtons can include any combination of Levels Zero through Three applications. In a first embodiment, information published by the pharmacy is directed to a communication layer 530 of the underlying software platform 536 of the present invention. This communication layer passively broadcasts the published information to all NetButtons on the client device.

In a second embodiment, the underlying software platform includes a routing layer 532 that is operable to direct published information from one NetButton to another specific NetButton or group of NetButtons. In this second embodiment, explicit addressing can be implemented in the message routing layer such that published information can be routed to specific NetButtons. The routing layer can be configured to determine the origin of published information and, in response thereto, to direct the published information to preselected NetButtons or types of NetButtons. Thus, for example, published information regarding a sale by an on-line pharmacy can be directed to NetButton applications for a credit card company and for a shipping company, but not to a NetButton for an on-line music distribution service.

In the preferred embodiment of the present invention, a broker 534 is used to intelligently mediate the transfer of published information. Thus, the broker adds a layer of intelligence to the explicit addressing permitted by the routing layer. This embodiment is advantageous because the broker can be used to provide a layer of security to the transfer of published information. The broker can be implemented as a standalone application or can be implemented as a part of the underlying software layer. This underlying software layer can be a part of the dedicated software platform that has previously been described with respect to the invention. Alternatively, the underlying software layer can be a separate software application from the dedicated software platform.

In the preferred embodiment, the only communications among NetButton applications on the client device are those that are explicitly enabled by the user. The user can configure the broker application to regulate the sources of published information, as well as the allowed destinations to which this information can be transmitted. Thus, the user can restrict the on-line pharmacy from publishing any information regarding the user's ordering history to the credit card application, but can permit this information to be transmitted to the shipping company. Similarly, the user can configure the broker to deny all publication of information, or to permit information to be published and transmitted to and from any and all NetButtons without restriction.

Another advantage of using a broker is the ability to mediate special commercial arrangements or deals among vendors. The broker can be provided with the information that there is a relationship between the on-line pharmacy company and the credit card company. Thus, the broker can make the user aware of special deals. For example, when the on-line pharmacy publishes sale information to the broker, the broker can notify the user that a related deal is being offered by another company and can provide the user with information regarding how to access this related deal, such as by downloading a NetButton for the other company to the client device.

Yet another advantage of using a broker is the ability to provide the broker with special instructions, requirements, or preselected criteria. As an example, the user can configure the broker to accept any sale of particular merchandise from the on-line pharmacy at a predetermined price. The user can instruct the broker to transmit information regarding this sale directly to the credit card NetButton with an instruction to purchase the item.

A broker can be provided as any level application, from Level Zero through Level 3. In the preferred embodiment of the present invention, the broker has a set of modifiable characteristics. In one embodiment of the invention, the broker is configured to accommodate different user experience levels. Thus, a beginning user can use a more simple, predefined interface to mediate transfer of published information, while a more experienced user can customize the interface to meet the user's requirements.

Figure 28:
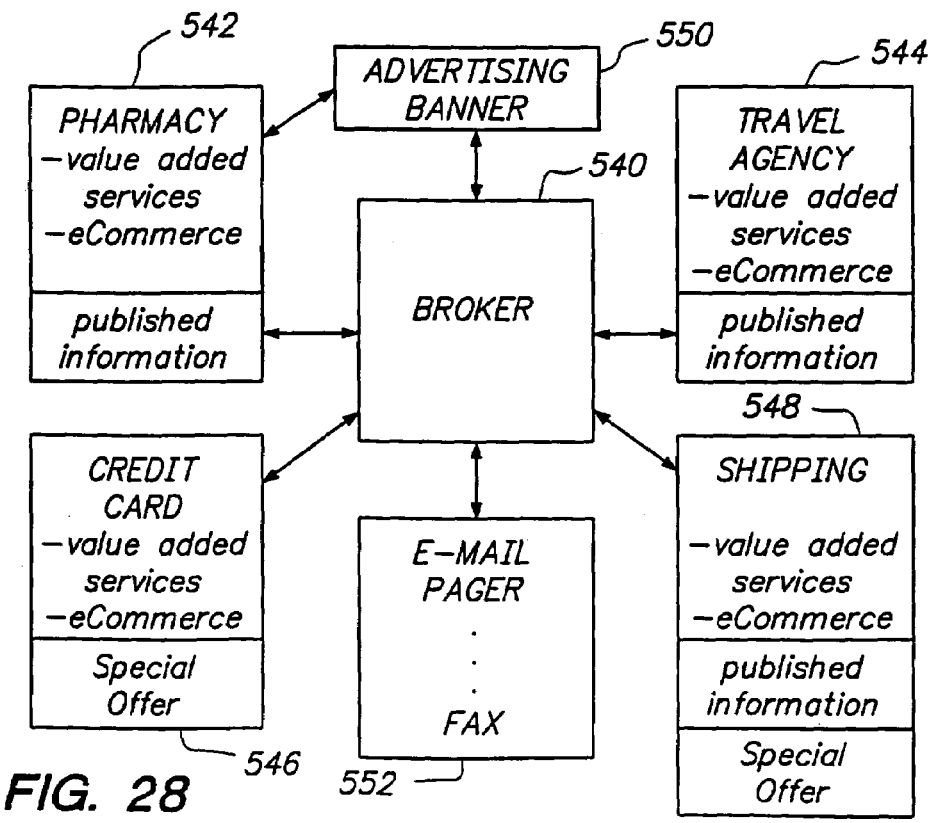
FIG. 28 is a system diagram illustrating an example of broker-mediated communication among applications according to the preferred embodiment of the present invention.

FIG. 28 is a system diagram illustrating an example of broker-mediated communication among applications according to the preferred embodiment of the present invention. In the figure, a broker 540 is used to mediate the transfer of published information among an on-line pharmacy application 542, a travel agency application 544, a credit card application 546, and a shipping company application 548. In this example, the NetButtons for the on-line pharmacy, credit card, travel agency, and shipping company offer the user value added services as well as eCommerce functionality. Thus, the on-line pharmacy NetButton can display value added services, such as a user-accessible formulary, and eCommerce functions such as the on-line sale of pharmaceutical items.

A NetButton that receives information published by another NetButton can respond thereto by publishing its own information. As an example, the pharmacy NetButton can publish information regarding a sale. When this notification is transmitted by the broker to the credit card NetButton, the credit card company can respond by publishing an offer to give the user a discount if the user buys the sale merchandise from the on-line pharmacy using the company's credit card. In another example, a travel agency can use the present invention to publish information regarding a tropical vacation. The on-line pharmacy can respond by publishing a sale price for suntan lotion, and the credit card company can publish a discounted rate for payment by credit card. That publication can occur by putting up a display message or graphic on the computer screen, or by communicating directly with the on-line pharmacy application. The user can then use any other appropriate means to respond to this offer. For example, the user can drag the NetButton for the credit card onto that for the on-line pharmacy, in accordance with the teachings of the present invention, to pay for the merchandise.

In one embodiment, advertising banners 550 displayed in the client desktop can be linked to any or all NetButtons and to the broker. Thus, when a NetButton publishes information regarding a sale to the broker for transmission to another NetButton, the broker can initiate the display of an advertising banner in response to this published information. In the example of the tropical vacation information published by the travel agency, an advertisement for a car rental company can be displayed in the banner in response thereto. Alternatively, the NetButton can publish information directly to an advertising banner as well as to the broker.

In one embodiment of the invention, the user can configure the broker to respond to preselected criteria. For example, the user can instruct the broker to purchase an item from the on-line pharmacy if a particular sale price is published by publishing information from the user's credit card NetButton to the NetButton of the on-line pharmacy. The user can instruct the broker to transmit a message 552 such as a query or to forward the message to the user at some convenient location, for example by e-mail, pager, or fax upon the occurrence of a specific event. The user can then communicate a response to the broker. Thus, a user can be immediately notified when the on-line travel agency publishes information regarding special rates for a vacation and can instruct the broker to purchase the vacation or to request further information from the travel agency.

In another embodiment of the present invention, the broker can be used to communicate among non-business related applications on the client device. For example, the broker can be used to mediate transfers of published information such as notices of upcoming events. In addition, the teachings of the present invention can be used in conjunction with the TubeTop interface to exchange published information among applications on the client device or among any points on the electronic network. For example, the broker can be configured to publish information about a vacation to a NetButton on the client device for a credit card as well as to a TubeTop for an organization that frequently sponsors trips for its members.

Interapplication communication according to the present invention can use the TubeTop and tube system to exchange messages between points on the electronic network e.g. to a user, to an application, or to a particular device. This preferred embodiment can also use to advantage the addressing capabilities of the invention. Therefore, published information can be distributed to addresses and sub-addresses based upon an arbitrary user-defined set of rules, as has been described previously with respect to message routing.

For example, a NetButton for an on-line music distributor can publish information about a sale of a performer's CD. This information can be published not only to other NetButtons on the client device, but also to a TubeTop on the client device for a fan club of that particular performer. Thus, the published information will also be distributed to other client devices.

What is claimed is:

1. A method for continuous, interactive communication across an electronic network, comprising the steps of:

connecting a first addressable device to the electronic network;

displaying on the first addressable device a graphical representation associated with a application;

providing a client application module associated with the application that is operable on the first addressable device;

providing a server application module associated with the application that is operable on an application provider server coupled to the first addressable device over the electronic network;

determining whether the application is one of a first type application that is executed exclusively on the application provider server, a second type application that is executed on the application provider server and utilizes a subset of programming code on the first addressable device, a third type application that is executed on the first addressable device and communicates with programming code on the application provider server, or a fourth type application that is executed exclusively on the first addressable device;

implementing the application through message-based communication between the client application module and the server application module, the application type determining the content of the messages comprising the application; and using the graphical representation to permit interaction between the application and the electronic network;

displaying a representation of data on the first addressable device; and automatically manipulating the data according to the application by moving the displayed representation of the data onto the graphical representation of the application;

wherein the interactive communications between the client application module and the server application module is performed independently of a web browser application.

2. The method according to claim 1, wherein moving the displayed representation of the data onto the graphical representation of the application is operable to transmit the data to an address on the electronic network.

3. The method according to claim 1, wherein moving the displayed representation of the data onto the graphical representation of the application is operable to transmit the data to an addressable device represented by the graphical representation.

4. A method for continuous, interactive communication across an electronic network, comprising the steps of:

displaying on the first addressable device a graphical representation associated with a application;

providing a client application module associated with the application that is operable on the first addressable device;

providing a server application module associated with the application that is operable on an application provider server coupled to the first addressable device over the electronic network;

determining whether the application is one of a first type application that is executed exclusively on the application provider server, a second type application that is executed on the application provider server and utilizes a subset of programming code on the first addressable device, a third type application that is executed on the first addressable device and communicates with programming code on the application provider server, or a fourth type application that is executed exclusively on the first addressable device;

implementing the application through message-based communication between the client application module and the server application module, the application type determining the content of the messages comprising the application; and using the graphical representation to permit interaction between the application and the electronic network;

transmitting the graphical representation across the electronic network;

providing a bi-directional permanent connection between the first addressable device and at least a second addressable device on the electronic network;

displaying on at least one of the first and second addressable devices an iconic representation of the permanent connection; and using the iconic representation to transmit the graphical representation between the first and second addressable devices;

wherein the interactive communications between the client application module and the server application module is performed independently of a web browser application.

5. The method of claim 4, wherein the iconic representation is a one-to-one connection for bi-directionally publishing and receiving messages.

6. The method of claim 4, wherein the iconic representation is a one-to-many connection for bi-directionally publishing and receiving messages.

7. A method for continuous, interactive communication across an electronic network, comprising the steps of:

connecting a first addressable device to the electronic network;

displaying on the first addressable device a graphical representation associated with a application;

providing a client application module associated with the application that is operable on the first addressable device;

providing a server application module associated with the application that is operable on an application provider server coupled to the first addressable device over the electronic network;

determining whether the application is one of a first type application that is executed exclusively on the application provider server, a second type application that is executed on the application provider server and utilizes a subset of programming code on the first addressable device, a third type application that is executed on the first addressable device and communicates with programming code on the application provider server, or a fourth type application that is executed exclusively on the first addressable device;

implementing the application through message-based communication between the client application module and the server application module, the application type determining the content of the messages comprising the application; and using the graphical representation to permit interaction between the application and the electronic network;

storing, in a message store, a message associated with the application, wherein the message store is at least one non-volatile storage medium accessible to the application provider server;

storing a message during an off-line process in a client message store accessible to the first addressable device;

wherein the interactive communications between the client application module and the server application module is performed independently of a web browser application.

8. The method of claim 4 further comprising the steps of:

selecting a level of bandwidth consumption for data to be transmitted through the permanent, bi-directional connection;

transmitting the data in accordance with the selected bandwidth level;

storing the transmitted data in a transactionally safe store accessible to the electronic network; and permitting a continuous interaction between the transactionally safe store and an application accessible to a device on the electronic network.

9. The method of claim 8, further comprising the steps of:

automatically reconnecting a prematurely terminated connection between the device and the electronic network; and recommencing a data transmission interrupted by the prematurely terminated connection at the point at which the transmission was terminated.

10. A system for communication across an electronic network comprising:

a first addressable device connected to the electronic network;

a graphical representation module for displaying on the first addressable device a graphical representation associated with an application, wherein the graphical representation is operable to permit continuous, bi-directional interaction between the application and the electronic network, and further wherein the interaction is performed independently of a web browser application;

a client application module associated with the application operable on the first addressable device; and a server application module associated with the application operable on an application provider server coupled to the first addressable device over the electronic network;

means for determining whether the application is one of a first type application that is executed exclusively on the application provider server, a second type application that is executed on the application provider server and utilizes a subset of programming code on the first addressable device, a third type application that is executed on the first addressable device and communicates with programming code on the application provider server, or a fourth type application that is executed exclusively on the first addressable device; and means for implementing the application through message-based communication between the client application module and the server application module, the application type determining the content of the messages comprising the application; and a transmitting module for transmitting the graphical representation across the electronic network.

11. The system of claim 10, further comprising:

means for providing a permanent connection between the first addressable device and at least a second addressable device on the electronic network;

means for displaying on at least one of the first and second addressable devices an iconic representation of the permanent connection; and means for using the iconic representation to transmit the graphical representation between the first and second addressable devices.

12. A system for communication across an electronic network comprising:

a first addressable device connected to the electronic network;

a graphical representation module for displaying on the first addressable device a graphical representation associated with an application, wherein the graphical representation is operable to permit continuous, bi-directional interaction between the application and the electronic network, and further wherein the interaction is performed independently of a web browser application;

a client application module associated with the application operable on the first addressable device; and a server application module associated with the application operable on an application provider server coupled to the first addressable device over the electronic network;

means for determining whether the application is one of a first type application that is executed exclusively on the application provider server, a second type application that is executed on the application provider server and utilizes a subset of programming code on the first addressable device, a third type application that is executed on the first addressable device and communicates with programming code on the application provider server, or a fourth type application that is executed exclusively on the first addressable device; and means for implementing the application through message-based communication between the client application module and the server application module, the application type determining the content of the messages comprising the application;

a bi-directional communications channel through the electronic network for supporting the bi-directional interaction;

a first storage module within the bi-directional communications channel for allowing messages to be stored while the first addressable device is offline from the electronic network;

an electronic network management system;

at least one gateway for connecting the management system to at least one addressable device that is not on the electronic network;

a second storage module accessible to the client device for allowing messages to be stored while the first addressable device is offline from the electronic network;

a third storage module accessible to the first addressable device for storing application state data; and a user management system for managing system and client configurations.

* * * * *

UNITED STATES PATENT AND TRADEMARK OFFICE
CERTIFICATE OF CORRECTION

PATENT NO. : 7,155,477 B2 Page 1 of 1
APPLICATION NO. : 09/896017
DATED : December 26, 2006
INVENTOR(S) : John Blair and Robert Pasker It is certified that error appears in the above-identified patent and that said Letters Patent is hereby corrected as shown below:

Title Page item 63 - insert

Related U.S. Application Data

Provisional Application No. 60/167,458 filed November 24, 1999.

Col. 1, line 4 should read:

CROSS REFERENCE TO RELATED APPLICATIONS

The present application claims priority to PCT Application No. PCT/US00/32246 entitled "Method And System For Continuous Interactive Communication In An Electronic Network," filed November 22, 2000 which claims priority to provisional application serial no. 60/167,458 entitled "Method And System For Continuous Interactive Communication In An Electronic Network," filed November 24, 1999.

Signed and Sealed this

Twenty-first Day of October, 2008

JON W. DUDAS
*Director of the United States Patent and Trademark Office*